US011690066B2

(12) United States Patent
Sengupta et al.

(10) Patent No.: US 11,690,066 B2
(45) Date of Patent: Jun. 27, 2023

(54) RETRANSMISSION AND FALLBACK FOR AUTONOMOUS UPLINK TRANSMISSION

(71) Applicant: QUALCOMM Incorporated, San Diego, CA (US)

(72) Inventors: Ayan Sengupta, San Diego, CA (US); Alberto Rico Alvarino, San Diego, CA (US); Le Liu, Fremont, CA (US); Umesh Phuyal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 130 days.

(21) Appl. No.: 16/525,410

(22) Filed: Jul. 29, 2019

(65) Prior Publication Data

US 2020/0037309 A1 Jan. 30, 2020

Related U.S. Application Data

(60) Provisional application No. 62/712,189, filed on Jul. 30, 2018.

(51) Int. Cl.
*H04W 72/00* (2023.01)
*H04W 74/08* (2009.01)
(Continued)

(52) U.S. Cl.
CPC ............ *H04W 72/21* (2023.01); *H04L 5/005* (2013.01); *H04L 5/0055* (2013.01);
(Continued)

(58) Field of Classification Search
CPC ......... H04W 72/0413; H04W 72/1284; H04W 72/04; H04W 72/1268; H04W 72/14;
(Continued)

(56) References Cited

U.S. PATENT DOCUMENTS

| 10,362,574 B2 | 7/2019 | Chendamarai Kannan et al. |
| 2012/0069805 A1* | 3/2012 | Feuersanger ..... H04W 72/0413 370/329 |

(Continued)

FOREIGN PATENT DOCUMENTS

| CN | 108243497 A | 7/2018 |
| WO | WO-2018094247 A1 | 5/2018 |
| WO | WO-2019245662 A1 * | 12/2019 |

OTHER PUBLICATIONS

International Search Report and Written Opinion—PCT/US2019/044134—ISA/EPO—dated Oct. 25, 2019.
(Continued)

*Primary Examiner* — Ricardo H Castaneyra
(74) *Attorney, Agent, or Firm* — Holland & Hart LLP

(57) ABSTRACT

Methods, systems, and devices for wireless communications are described. A user equipment (UE) may transmit an autonomous uplink (AUL) transmission to a base station using a configured resource set, the AUL transmission comprising reference signals and data signals. The UE may determine whether a response signal was received from the base station in response to the AUL transmission. The UE may determine whether the response signal indicates that the base station received the reference signals, or the reference signals and the data signals. The UE may select an uplink transmission scheme to use for subsequent transmissions to the base station, the selected uplink transmission scheme based at least in part on the determination of whether the response signal was received from the base station and whether the response signal indicates that the base station received the reference signals or the reference signals and the data signals.

27 Claims, 15 Drawing Sheets

(51) Int. Cl.
  *H04W 72/21*   (2023.01)
  *H04L 5/00*    (2006.01)
  *H04W 52/36*   (2009.01)
  *H04W 52/48*   (2009.01)

(52) U.S. Cl.
  CPC .......... *H04W 52/36* (2013.01); *H04W 52/48* (2013.01); *H04W 74/0833* (2013.01)

(58) Field of Classification Search
  CPC .......... H04W 72/042; H04W 74/0833; H04W 52/146; H04W 52/50; H04W 52/08; H04W 52/48; H04W 52/36; H04W 72/21; H04W 74/004; H04L 1/1893; H04L 5/001; H04L 5/0026; H04L 5/0053; H04L 5/0091; H04L 5/008; H04L 5/0033; H04L 5/14; H04L 5/0044; H04L 5/0048; H04L 5/0055; H04L 5/005
  See application file for complete search history.

(56) References Cited

U.S. PATENT DOCUMENTS

| | | | | |
|---|---|---|---|---|
| 2012/0300715 | A1* | 11/2012 | Pelletier | H04W 74/0891 370/329 |
| 2014/0254544 | A1 | 9/2014 | Kar Kin Au et al. | |
| 2018/0288746 | A1* | 10/2018 | Zhang | H04L 5/0048 |
| 2019/0075598 | A1* | 3/2019 | Li | H04W 88/023 |
| 2019/0104551 | A1* | 4/2019 | Deenoo | H04W 72/0453 |
| 2019/0150184 | A1* | 5/2019 | Golitschek Edler Von Elbwart | H04L 1/1887 370/329 |
| 2019/0223227 | A1* | 7/2019 | Jiang | H04W 74/0833 |
| 2019/0253193 | A1* | 8/2019 | Kim | H04L 1/1614 |
| 2020/0014495 | A1* | 1/2020 | Niu | H04L 1/188 |
| 2020/0213901 | A1* | 7/2020 | Yoshimoto | H04L 1/1851 |
| 2020/0296749 | A1* | 9/2020 | Freda | H04W 28/0268 |

OTHER PUBLICATIONS

Huawei et al., "Remaining issues for AUL HARQ operation", 3GPP Draft; R1-1719499, 3rd Generation Partnership Project (3GPP), Mobile Competence Centre ; 650, Route Des Lucioles ; F-06921 Sophia-Antipolis Cedex; France, vol. RAN WG1, No. Reno, USA; Nov. 27, 2017-Dec. 1, 2017, Nov. 17, 2017 (Nov. 17, 2017), XP051368807, 5 Pages, Retrieved from the Internet: URL:http://www.3gpp.org/ftp/tsg%5Fran/WG1%5FRL1/TSGR1%5F91/Docs/ [retrieved on Nov. 17, 2017], pp. 2-4.

Huawei, et al., "HARQ with Autonomous Uplink Access on LAA SCell", 3GPP TSG RAN WG2 Meeting #99, 3GPP Draft; R2-1708893 HARQ with Autonomous Uplink Access on LAA SCell, 3rd Generation Partnership Project (3GPP), Mobile Competence Centre, 650, Route Des Lucioles, F-06921 Sophia-Antipolis Cedex, France, vol. RAN WG2. No. Berlin, Germany; Aug. 21, 2017-Aug. 25, 2017, Aug. 20, 2017 (Aug. 20, 2017), 9 Pages, XP051318692, Retrieved from the Internet: URL: https://www.3gpp.org/ftp/Meetings_3GPP SYNC/RAN2/Docs/[retrieved on Aug. 20, 2017], pp. 1-3.

Huawei, et al., "On HARQ Operation for AUL", 3GPP Draft; 3GPP TSG RAN WG1 Meeting #90bis, R1-1717116, 3rd Generation Partnership Project (3GPP), Mobile Competence Centre, 650, Route Des Lucioles; F-06921 Sophia-Antipolis Cedex, France, vol. RAN WG1, No. Prague, Czech Republic; Oct. 9, 2017-Oct. 13, 2017, Oct. 8, 2017 (Oct. 8, 2017), 5 Pages, XP051340306, Retrieved from the Internet: URL: http://www.3gpp.org/ftp/Meetings_3GPP_SYNC/RAN1/Docs/[retrieved on Oct. 8, 2017], pp. 1-4.

Huawei, et al., "HARQ for Autonomous UL Access on Unlicensed SCell," 3GPP TSG RAN WG1 Meeting #90, R1-1712125, Prague, Czech Republic, Aug. 21-25, 2017, (Aug. 25, 2017), 4 pages.

Samsung: "HARQ for Autonomous UL Access," 3GPP TSG RAN WG1 Meeting #92, R1-1801916, Athens, Greece, Feb. 26-Mar. 2, 2018, (Mar. 2, 2018), 3 pages.

Taiwan Search Report—TW108126965—TIPO—dated Sep. 26, 2022.

* cited by examiner

RETRANSMISSION AND FALLBACK FOR AUTONOMOUS UPLINK TRANSMISSION

CROSS REFERENCE

The present application for patent claims the benefit of U.S. Provisional Patent Application No. 62/712,189 by SENGUPTA, et al., entitled "RETRANSMISSION AND FALLBACK FOR AUTONOMOUS UPLINK TRANSMISSION," filed Jul. 30, 2018, assigned to the assignee hereof, and expressly incorporated herein.

BACKGROUND

The following relates generally to wireless communications, and more specifically to retransmission and fallback for autonomous uplink (AUL) transmission.

Wireless communications systems are widely deployed to provide various types of communication content such as voice, video, packet data, messaging, broadcast, and so on. These systems may be capable of supporting communication with multiple users by sharing the available system resources (e.g., time, frequency, and power). Examples of such multiple-access systems include fourth generation (4G) systems such as Long Term Evolution (LTE) systems, LTE-Advanced (LTE-A) systems, or LTE-A Pro systems, and fifth generation (5G) systems which may be referred to as New Radio (NR) systems. These systems may employ technologies such as code division multiple access (CDMA), time division multiple access (TDMA), frequency division multiple access (FDMA), orthogonal frequency division multiple access (OFDMA), or discrete Fourier transform-spread-OFDM (DFT-S-OFDM). A wireless multiple-access communications system may include a number of base stations or network access nodes, each simultaneously supporting communication for multiple communication devices, which may be otherwise known as user equipment (UE).

Wireless communication systems may use various transmission schemes to support communications between a UE and base station. In some examples, the transmission schemes may support uplink transmissions based, at least in some aspects, on a random access procedure. For example, some legacy transmission schemes may support a four-step uplink random access procedure that allows data transmission in message five (Msg5) of the random access procedure. Another legacy transmission scheme may support early data transmission, which generally utilizes a two-step uplink access procedure that allows data transmission in message three (Msg3) of the random access procedure.

In some examples, the transmission scheme may support uplink data transmissions in message one (Msg1) using configured resources. Certain aspects of this transmission scheme may be supported when the UE has a valid timing advance (TA), such as when the UE is stationary. This transmission scheme may also be considered a grantless transmission, which may also be referred to as an AUL transmission. However, conventional techniques do not provide a mechanism for the UE to retransmit the AUL transmission and/or fall back to another legacy transmission scheme when the initial AUL transmission fails.

SUMMARY

The described techniques relate to improved methods, systems, devices, and apparatuses that support retransmission and fallback for autonomous uplink (AUL) transmission. Generally, the described techniques provide for a user equipment (UE) to recover when an AUL transmission fails. The UE may be configured with one or more resource sets. In some aspects, each resource set may include time/frequency resources for the UE to use to perform the AUL transmission, e.g., an uplink transmission using message one (Msg1) of the random access procedure. In some aspects, multiple UEs may be configured with the same, or at least partially overlapping, resource sets. In some aspects, each configured resource set may be based on an identifier (e.g., an index or sequence) for reference signals (e.g., demodulation reference signals (DMRS)) for the AUL transmission. The UE may select a configured resource set and use the corresponding resources to perform the AUL transmission, e.g., to transmit the reference signals and data signals. The base station may receive none, some, or all of the AUL transmission, and respond accordingly. For example, the base station may not respond (e.g., may not send a response signal) when it doesn't receive the reference signals and/or the associated data. The base station may respond with an acknowledgement (ACK) signal when it receives the reference signals and the data signals. The base station may send another response signal when it detects the reference signals, but not the data signals. The UE may determine if a response signal was received and, if so, what is indicated in the response signal. The UE may select a transmission scheme to use for communicating with the base station based on the response signal, if any (e.g., may determine how to retransmit the data to the base station, to fallback to a legacy transmission scheme, or to continue using the configured resource set for communicating with the base station).

A method of wireless communication at a UE is described. The method may include transmitting an autonomous uplink transmission to a base station using a configured resource set, the autonomous uplink transmission including reference signals and data signals, determining whether a response signal was received from the base station in response to the autonomous uplink transmission, upon determining that the response signal was received, determining whether the response signal indicates that the base station received the reference signals, or the reference signals and the data signals, and selecting an uplink transmission scheme to use for subsequent transmissions to the base station, the selected uplink transmission scheme based on the determination of whether the response signal was received from the base station and whether the response signal indicates that the base station received the reference signals or the reference signals and the data signals.

An apparatus for wireless communication at a UE is described. The apparatus may include a processor, memory coupled with the processor, and instructions stored in the memory. The instructions may be executable by the processor to cause the apparatus to transmit an autonomous uplink transmission to a base station using a configured resource set, the autonomous uplink transmission including reference signals and data signals, determine whether a response signal was received from the base station in response to the autonomous uplink transmission, upon determining that the response signal was received, determining whether the response signal indicates that the base station received the reference signals, or the reference signals and the data signals, and select an uplink transmission scheme to use for subsequent transmissions to the base station, the selected uplink transmission scheme based on the determination of whether the response signal was received from the base station and whether the response signal indicates that the base station received the reference signals or the reference signals and the data signals.

Another apparatus for wireless communication at a UE is described. The apparatus may include means for transmitting an autonomous uplink transmission to a base station using a configured resource set, the autonomous uplink transmission including reference signals and data signals, determining whether a response signal was received from the base station in response to the autonomous uplink transmission, upon determining that the response signal was received, determining whether the response signal indicates that the base station received the reference signals, or the reference signals and the data signals, and selecting an uplink transmission scheme to use for subsequent transmissions to the base station, the selected uplink transmission scheme based on the determination of whether the response signal was received from the base station and whether the response signal indicates that the base station received the reference signals or the reference signals and the data signals.

A non-transitory computer-readable medium storing code for wireless communication at a UE is described. The code may include instructions executable by a processor to transmit an autonomous uplink transmission to a base station using a configured resource set, the autonomous uplink transmission including reference signals and data signals, determine whether a response signal was received from the base station in response to the autonomous uplink transmission, upon determining that the response signal was received, determining whether the response signal indicates that the base station received the reference signals, or the reference signals and the data signals, and select an uplink transmission scheme to use for subsequent transmissions to the base station, the selected uplink transmission scheme based on the determination of whether the response signal was received from the base station and whether the response signal indicates that the base station received the reference signals or the reference signals and the data signals.

Some examples of the method, apparatuses, and non-transitory computer-readable medium described herein may further include operations, features, means, or instructions for determining that no response signal was received from the base station.

Some examples of the method, apparatuses, and non-transitory computer-readable medium described herein may further include operations, features, means, or instructions for performing a retransmission of the autonomous uplink transmission using the configured resource set or using a different configured resource set.

Some examples of the method, apparatuses, and non-transitory computer-readable medium described herein may further include operations, features, means, or instructions for performing a power ramp-up procedure for the retransmission of the autonomous uplink transmission.

Some examples of the method, apparatuses, and non-transitory computer-readable medium described herein may further include operations, features, means, or instructions for selecting a legacy uplink transmission scheme to use to retransmit the autonomous uplink transmission.

In some examples of the method, apparatuses, and non-transitory computer-readable medium described herein, the determining that no response signal was received from the base station may be based on a determination that no response signal was received within a response window.

In some examples of the method, apparatuses, and non-transitory computer-readable medium described herein, the response window may be based on an acknowledgement/negative-acknowledgement (ACK/NACK) response window, a random access response window, or a combination thereof.

Some examples of the method, apparatuses, and non-transitory computer-readable medium described herein may further include operations, features, means, or instructions for determining that the response signal was received from the base station, where the response signal indicates that the base station received the reference signals, where the indication may be based on an identifier associated with the reference signals.

Some examples of the method, apparatuses, and non-transitory computer-readable medium described herein may further include operations, features, means, or instructions for selecting, based on the indication, an updated configured resource set to use for retransmitting the autonomous uplink transmission and retransmitting the autonomous uplink transmission using the updated configured resource set.

Some examples of the method, apparatuses, and non-transitory computer-readable medium described herein may further include operations, features, means, or instructions for decoding the response signal to determine an identifier for an updated configured resource set to use for retransmitting the autonomous uplink transmission and selecting, based on the identifier, the updated configured resource set to use for retransmitting the autonomous uplink transmission.

In some examples of the method, apparatuses, and non-transitory computer-readable medium described herein, the updated configured resource set includes at least one of a larger bandwidth parameter, a larger transmission window parameter, a larger resource set, or a combination thereof, than the configured resource set.

In some examples of the method, apparatuses, and non-transitory computer-readable medium described herein, the response signal may include operations, features, means, or instructions for selecting, based on the power control command, a transmit power to use for the retransmission of the autonomous uplink transmission.

In some examples of the method, apparatuses, and non-transitory computer-readable medium described herein, the response signal may include operations, features, means, or instructions for selecting, based on the fallback indicator, a legacy transmission scheme to use for retransmitting the autonomous uplink transmission.

Some examples of the method, apparatuses, and non-transitory computer-readable medium described herein may further include operations, features, means, or instructions for skipping, based on the fallback indicator, a first portion of the legacy transmission scheme when retransmitting the autonomous uplink transmission.

Some examples of the method, apparatuses, and non-transitory computer-readable medium described herein may further include operations, features, means, or instructions for determining that the response signal was received from the base station, where the response signal indicates that the base station received the reference signals.

Some examples of the method, apparatuses, and non-transitory computer-readable medium described herein may further include operations, features, means, or instructions for determining that the response signal conveys a NACK indicator and performing a retransmission of the autonomous uplink transmission using the configured resources.

Some examples of the method, apparatuses, and non-transitory computer-readable medium described herein may further include operations, features, means, or instructions for wherein the response signal includes at least one of a backoff indicator, or a timing advance indicator, or a power control command, or a transport block size update indicator, or a redundancy version indicator, or a cyclic shift indicator, or an updated scrambling sequence indicator, or a retransmission request, or a resource grant for an updated configured resource set, or a combination thereof, to use for performing a retransmission of the autonomous uplink transmission.

In some examples of the method, apparatuses, and non-transitory computer-readable medium described herein, the response signal may include operations, features, means, or instructions for selecting, based on the fallback indicator, a legacy transmission scheme to use for retransmitting the autonomous uplink transmission.

Some examples of the method, apparatuses, and non-transitory computer-readable medium described herein may further include operations, features, means, or instructions for skipping, based on the fallback indicator, a first portion of the legacy transmission scheme when retransmitting the autonomous uplink transmission.

In some examples of the method, apparatuses, and non-transitory computer-readable medium described herein, the response signal may include operations, features, means, or instructions for selecting, based on the ACK indicator, a transmission scheme that uses the configured resource set for subsequent transmissions to the base station.

Some examples of the method, apparatuses, and non-transitory computer-readable medium described herein may further include operations, features, means, or instructions for determining whether the response signal was received from the base station based on an identifier associated with the configured resource set, on an identifier associated with the reference signals, or a combination thereof.

Some examples of the method, apparatuses, and non-transitory computer-readable medium described herein may further include operations, features, means, or instructions for decoding one or more bits or fields in the response signal to determine whether the response signal indicates that the base station received the reference signals or the reference signals and the data signals.

Some examples of the method, apparatuses, and non-transitory computer-readable medium described herein may further include operations, features, means, or instructions for identifying, based on the response signal, an updated configured resource set, where the updated configured resource set indicates whether the response signal indicates that the base station received the reference signals or the reference signals and the data signals.

A method of wireless communication at a base station is described. The method may include detecting an autonomous uplink transmission from a UE over a configured resource set, determining whether reference signals or reference signals and data signals are detected in the autonomous uplink transmission, configuring, based on the determining, a response signal for transmission to the UE, and transmitting the response signal to the UE.

An apparatus for wireless communication at a base station is described. The apparatus may include a processor, memory coupled with the processor, and instructions stored in the memory. The instructions may be executable by the processor to cause the apparatus to detect an autonomous uplink transmission from a UE over a configured resource set, determine whether reference signals or reference signals and data signals are detected in the autonomous uplink transmission, configure, based on the determining, a response signal for transmission to the UE, and transmit the response signal to the UE.

Another apparatus for wireless communication at a base station is described. The apparatus may include means for detecting an autonomous uplink transmission from a UE over a configured resource set, determining whether reference signals or reference signals and data signals are detected in the autonomous uplink transmission, configuring, based on the determining, a response signal for transmission to the UE, and transmitting the response signal to the UE.

A non-transitory computer-readable medium storing code for wireless communication at a base station is described. The code may include instructions executable by a processor to detect an autonomous uplink transmission from a UE over a configured resource set, determine whether reference signals or reference signals and data signals are detected in the autonomous uplink transmission, configure, based on the determining, a response signal for transmission to the UE, and transmit the response signal to the UE.

Some examples of the method, apparatuses, and non-transitory computer-readable medium described herein may further include operations, features, means, or instructions for configuring the response signal to includes an indicator associated with the base station receiving the reference signals.

Some examples of the method, apparatuses, and non-transitory computer-readable medium described herein may further include operations, features, means, or instructions for receiving a retransmission of the autonomous uplink transmission on an updated configured resource set.

Some examples of the method, apparatuses, and non-transitory computer-readable medium described herein may further include operations, features, means, or instructions for configuring the response signal to indicate an identifier for an updated configured resource set to use for retransmitting the autonomous uplink transmission and receiving the retransmission of the autonomous uplink transmission on the updated configured resource set.

Some examples of the method, apparatuses, and non-transitory computer-readable medium described herein may further include operations, features, means, or instructions for configuring the response signal to indicate a power control command.

Some examples of the method, apparatuses, and non-transitory computer-readable medium described herein may further include operations, features, means, or instructions for configuring the response signal to indicate a fallback indicator and receiving a retransmission of the autonomous uplink transmission according to a legacy transmission scheme.

Some examples of the method, apparatuses, and non-transitory computer-readable medium described herein may further include operations, features, means, or instructions for configuring the response signal to indicate a NACK indication and receiving a retransmission of the autonomous uplink transmission using the configured resources.

Some examples of the method, apparatuses, and non-transitory computer-readable medium described herein may further include operations, features, means, or instructions for configuring the response signal to indicate at least one of a backoff indicator, or a timing advance indicator, or a power control command, or a transport block size update indicator, or a redundancy version indicator, or a cyclic shift indicator, or an updated scrambling sequence indicator, or a retransmission request, or a resource grant for an updated configured resource set, or a combination thereof, for the UE to use for performing a retransmission of the autonomous uplink transmission.

DETAILED DESCRIPTION

Figure 1:
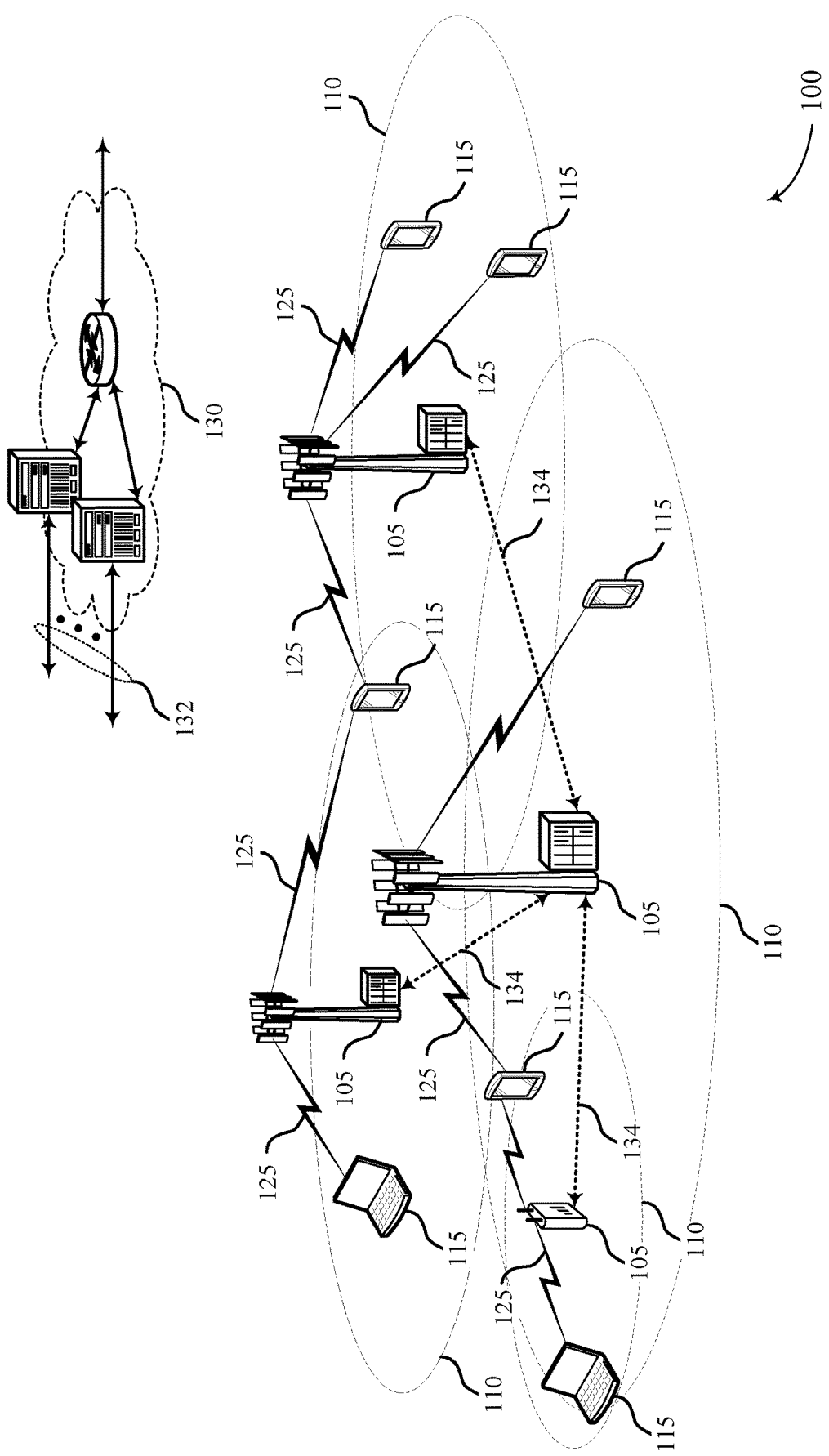
FIG. 1 illustrates an example of a system for wireless communications that supports retransmission and fallback for autonomous uplink (AUL) transmission in accordance with aspects of the present disclosure.

Wireless communication systems may use various transmission schemes to support communications between a user equipment (UE) and base station. For example, the transmission schemes may support uplink transmissions based, at least in some aspects, on a random access procedure. For example, some legacy transmission schemes may support a four-step uplink random access procedure that allows data transmission in message five (Msg5) of the random access procedure. Another legacy transmission scheme may support early data transmission, which generally utilizes a two-step uplink access procedure that allows data transmission in message three (Msg3) of the random access procedure.

In some examples, the transmission scheme may support uplink transmissions in message one (Msg1) using configured resources. Certain aspects of this transmission scheme may be supported when the UE has a valid timing advance (TA), such as when the UE is stationary. This transmission scheme may also be considered a grantless transmission in that at least some of the resources are configured for the UE, which may also be referred to as an autonomous uplink (AUL) transmission. However, conventional techniques do not provide a mechanism for the UE to retransmit the AUL transmission and/or fall back to a different transmission scheme, such as a legacy transmission scheme, when the initial AUL transmission fails.

Aspects of the disclosure are initially described in the context of a wireless communications system. Aspects of the disclosure provide for a UE to select a transmission scheme to use for communicating with the base station when an initial AUL transmission fails. The UE may be configured with one or more resource sets, e.g., time/frequency resources for the UE to use to perform the AUL transmission. In some aspects, multiple UEs may be configured with the same, or at least partially overlapping, resource sets. Each configured resource set may be based on an identifier (e.g., an index or sequence) for reference signals (e.g., demodulation reference signals (DMRS)) that accompany the data signals in the AUL transmission. The UE may select a configured resource set (e.g., the DMRS sequence) and use the corresponding resources to perform the AUL transmission, e.g., transmit the data signals and the reference signals. The base station may receive none, some, or all of the AUL transmission, and respond accordingly. For example, the base station may not respond at all when it doesn't receive any portion of the AUL transmission and/or when operating in an acknowledgement (ACK) mode and does not successfully decode the data signals. When the base station receives the reference signals (e.g., the DMRSs) and the data signals, the base station may respond with an ACK signal that indicates the AUL transmission was successful. In some situations, the base station may receive the reference signals, but may not be able to receive the data signals. In this situation, the base station may configure a response signal based, at least in some aspects, on the reference signals (e.g., may provide an explicit or implicit indication that the base station received the reference signals portion of the AUL transmission). The UE may determine if a response signal was received and, if so, what is indicated in the response signal. The UE may select a transmission scheme to use for communicating with the base station based on the response signal, if any (e.g., may determine how to retransmit the data to the base station, to fallback to a legacy transmission scheme, or to continue using the configured resource set for communicating with the base station).

Aspects of the disclosure are further illustrated by and described with reference to apparatus diagrams, system diagrams, and flowcharts that relate to retransmission and fallback for AUL transmission.

FIG. 1 illustrates an example of a wireless communications system 100 that supports retransmission and fallback for AUL transmission in accordance with aspects of the present disclosure. The wireless communications system 100 includes base stations 105, UEs 115, and a core network 130. In some examples, the wireless communications system 100 may be a Long Term Evolution (LTE) network, an LTE-Advanced (LTE-A) network, an LTE-A Pro network, or a New Radio (NR) network. In some cases, wireless communications system 100 may support enhanced broadband communications, ultra-reliable (e.g., mission critical) communications, low latency communications, or communications with low-cost and low-complexity devices.

Base stations 105 may wirelessly communicate with UEs 115 via one or more base station antennas. Base stations 105 described herein may include or may be referred to by those skilled in the art as a base transceiver station, a radio base station, an access point, a radio transceiver, a NodeB, an eNodeB (eNB), a next-generation Node B or giga-nodeB (either of which may be referred to as a gNB), a Home NodeB, a Home eNodeB, or some other suitable terminology. Wireless communications system 100 may include base stations 105 of different types (e.g., macro or small cell base stations). The UEs 115 described herein may be able to communicate with various types of base stations 105 and network equipment including macro eNBs, small cell eNBs, gNBs, relay base stations, and the like.

Each base station 105 may be associated with a particular geographic coverage area 110 in which communications with various UEs 115 is supported. Each base station 105 may provide communication coverage for a respective geographic coverage area 110 via communication links 125, and communication links 125 between a base station 105 and a UE 115 may utilize one or more carriers. Communication links 125 shown in wireless communications system 100 may include uplink transmissions from a UE 115 to a base station 105, or downlink transmissions from a base station 105 to a UE 115. Downlink transmissions may also be called forward link transmissions while uplink transmissions may also be called reverse link transmissions.

The geographic coverage area 110 for a base station 105 may be divided into sectors making up only a portion of the geographic coverage area 110, and each sector may be associated with a cell. For example, each base station 105 may provide communication coverage for a macro cell, a small cell, a hot spot, or other types of cells, or various combinations thereof. In some examples, a base station 105 may be movable and therefore provide communication coverage for a moving geographic coverage area 110. In some examples, different geographic coverage areas 110 associated with different technologies may overlap, and overlapping geographic coverage areas 110 associated with different technologies may be supported by the same base station 105 or by different base stations 105. The wireless communications system 100 may include, for example, a heterogeneous LTE/LTE-A/LTE-A Pro or NR network in which different types of base stations 105 provide coverage for various geographic coverage areas 110.

The term "cell" refers to a logical communication entity used for communication with a base station 105 (e.g., over a carrier), and may be associated with an identifier for distinguishing neighboring cells (e.g., a physical cell identifier (PCID), a virtual cell identifier (VCID)) operating via the same or a different carrier. In some examples, a carrier may support multiple cells, and different cells may be configured according to different protocol types (e.g., machine-type communication (MTC), narrowband Internet-of-Things (NB-IoT), enhanced mobile broadband (eMBB), or others) that may provide access for different types of devices. In some cases, the term "cell" may refer to a portion of a geographic coverage area 110 (e.g., a sector) over which the logical entity operates.

UEs 115 may be dispersed throughout the wireless communications system 100, and each UE 115 may be stationary or mobile. A UE 115 may also be referred to as a mobile device, a wireless device, a remote device, a handheld device, or a subscriber device, or some other suitable terminology, where the "device" may also be referred to as a unit, a station, a terminal, or a client. A UE 115 may also be a personal electronic device such as a cellular phone, a personal digital assistant (PDA), a tablet computer, a laptop computer, or a personal computer. In some examples, a UE 115 may also refer to a wireless local loop (WLL) station, an Internet of Things (IoT) device, an Internet of Everything (IoE) device, or an MTC device, or the like, which may be implemented in various articles such as appliances, vehicles, meters, or the like.

Some UEs 115, such as MTC or IoT devices, may be low cost or low complexity devices, and may provide for automated communication between machines (e.g., via Machine-to-Machine (M2M) communication). M2M communication or MTC may refer to data communication technologies that allow devices to communicate with one another or a base station 105 without human intervention. In some examples, M2M communication or MTC may include communications from devices that integrate sensors or meters to measure or capture information and relay that information to a central server or application program that can make use of the information or present the information to humans interacting with the program or application. Some UEs 115 may be designed to collect information or enable automated behavior of machines. Examples of applications for MTC devices include smart metering, inventory monitoring, water level monitoring, equipment monitoring, healthcare monitoring, wildlife monitoring, weather and geological event monitoring, fleet management and tracking, remote security sensing, physical access control, and transaction-based business charging.

Some UEs 115 may be configured to employ operating modes that reduce power consumption, such as half-duplex communications (e.g., a mode that supports one-way communication via transmission or reception, but not transmission and reception simultaneously). In some examples half-duplex communications may be performed at a reduced peak rate. Other power conservation techniques for UEs 115 include entering a power saving "deep sleep" mode when not engaging in active communications, or operating over a limited bandwidth (e.g., according to narrowband communications). In some cases, UEs 115 may be designed to support critical functions (e.g., mission critical functions), and a wireless communications system 100 may be configured to provide ultra-reliable communications for these functions.

In some cases, a UE 115 may also be able to communicate directly with other UEs 115 (e.g., using a peer-to-peer (P2P) or device-to-device (D2D) protocol). One or more of a group of UEs 115 utilizing D2D communications may be within the geographic coverage area 110 of a base station 105. Other UEs 115 in such a group may be outside the geographic coverage area 110 of a base station 105, or be otherwise unable to receive transmissions from a base station 105. In some cases, groups of UEs 115 communicating via D2D communications may utilize a one-to-many (1:M) system in which each UE 115 transmits to every other UE 115 in the group. In some cases, a base station 105 facilitates the scheduling of resources for D2D communications. In other cases, D2D communications are carried out between UEs 115 without the involvement of a base station 105.

Base stations 105 may communicate with the core network 130 and with one another. For example, base stations 105 may interface with the core network 130 through backhaul links 132 (e.g., via an S1, N2, N3, or another interface). Base stations 105 may communicate with one another over backhaul links 134 (e.g., via an X2, Xn, or other interface) either directly (e.g., directly between base stations 105) or indirectly (e.g., via core network 130).

The core network 130 may provide user authentication, access authorization, tracking, Internet Protocol (IP) connectivity, and other access, routing, or mobility functions. The core network 130 may be an evolved packet core (EPC), which may include at least one mobility management entity (MME), at least one serving gateway (S-GW), and at least one Packet Data Network (PDN) gateway (P-GW). The MME may manage non-access stratum (e.g., control plane) functions such as mobility, authentication, and bearer management for UEs 115 served by base stations 105 associated with the EPC. User IP packets may be transferred through the S-GW, which itself may be connected to the P-GW. The P-GW may provide IP address allocation as well as other functions. The P-GW may be connected to the network operators IP services. The operators IP services may include access to the Internet, Intranet(s), an IP Multimedia Subsystem (IMS), or a Packet-Switched (PS) Streaming Service.

At least some of the network devices, such as a base station 105, may include subcomponents such as an access network entity, which may be an example of an access node controller (ANC). Each access network entity may communicate with UEs 115 through a number of other access network transmission entities, which may be referred to as a radio head, a smart radio head, or a transmission/reception point (TRP). In some configurations, various functions of each access network entity or base station 105 may be distributed across various network devices (e.g., radio heads and access network controllers) or consolidated into a single network device (e.g., a base station 105).

Wireless communications system 100 may operate using one or more frequency bands, typically in the range of 300 MHz to 300 GHz. Generally, the region from 300 MHz to 3 GHz is known as the ultra-high frequency (UHF) region or decimeter band, since the wavelengths range from approximately one decimeter to one meter in length. UHF waves may be blocked or redirected by buildings and environmental features. However, the waves may penetrate structures sufficiently for a macro cell to provide service to UEs 115 located indoors. Transmission of UHF waves may be associated with smaller antennas and shorter range (e.g., less than 100 km) compared to transmission using the smaller frequencies and longer waves of the high frequency (HF) or very high frequency (VHF) portion of the spectrum below 300 MHz.

Wireless communications system 100 may also operate in a super high frequency (SHF) region using frequency bands from 3 GHz to 30 GHz, also known as the centimeter band. The SHF region includes bands such as the 5 GHz industrial, scientific, and medical (ISM) bands, which may be used opportunistically by devices that can tolerate interference from other users.

Wireless communications system 100 may also operate in an extremely high frequency (EHF) region of the spectrum (e.g., from 30 GHz to 300 GHz), also known as the millimeter band. In some examples, wireless communications system 100 may support millimeter wave (mmW) communications between UEs 115 and base stations 105, and EHF antennas of the respective devices may be even smaller and more closely spaced than UHF antennas. In some cases, this may facilitate use of antenna arrays within a UE 115. However, the propagation of EHF transmissions may be subject to even greater atmospheric attenuation and shorter range than SHF or UHF transmissions. Techniques disclosed herein may be employed across transmissions that use one or more different frequency regions, and designated use of bands across these frequency regions may differ by country or regulating body.

In some cases, wireless communications system 100 may utilize both licensed and unlicensed radio frequency spectrum bands. For example, wireless communications system 100 may employ License Assisted Access (LAA), LTE-Unlicensed (LTE-U) radio access technology, or NR technology in an unlicensed band such as the 5 GHz ISM band. When operating in unlicensed radio frequency spectrum bands, wireless devices such as base stations 105 and UEs 115 may employ listen-before-talk (LBT) procedures to ensure a frequency channel is clear before transmitting data. In some cases, operations in unlicensed bands may be based on a CA configuration in conjunction with CCs operating in a licensed band (e.g., LAA). Operations in unlicensed spectrum may include downlink transmissions, uplink transmissions, peer-to-peer transmissions, or a combination of these. Duplexing in unlicensed spectrum may be based on frequency division duplexing (FDD), time division duplexing (TDD), or a combination of both.

In some examples, base station 105 or UE 115 may be equipped with multiple antennas, which may be used to employ techniques such as transmit diversity, receive diversity, multiple-input multiple-output (MIMO) communications, or beamforming. For example, wireless communications system 100 may use a transmission scheme between a transmitting device (e.g., a base station 105) and a receiving device (e.g., a UE 115), where the transmitting device is equipped with multiple antennas and the receiving devices are equipped with one or more antennas. MIMO communications may employ multipath signal propagation to increase the spectral efficiency by transmitting or receiving multiple signals via different spatial layers, which may be referred to as spatial multiplexing. The multiple signals may, for example, be transmitted by the transmitting device via different antennas or different combinations of antennas. Likewise, the multiple signals may be received by the receiving device via different antennas or different combinations of antennas. Each of the multiple signals may be referred to as a separate spatial stream, and may carry bits associated with the same data stream (e.g., the same codeword) or different data streams. Different spatial layers may be associated with different antenna ports used for channel measurement and reporting. MIMO techniques include single-user MIMO (SU-MIMO) where multiple spatial layers are transmitted to the same receiving device, and multiple-user MIMO (MU-MIMO) where multiple spatial layers are transmitted to multiple devices.

Beamforming, which may also be referred to as spatial filtering, directional transmission, or directional reception, is a signal processing technique that may be used at a transmitting device or a receiving device (e.g., a base station 105 or a UE 115) to shape or steer an antenna beam (e.g., a transmit beam or receive beam) along a spatial path between the transmitting device and the receiving device. Beamforming may be achieved by combining the signals communicated via antenna elements of an antenna array such that signals propagating at particular orientations with respect to an antenna array experience constructive interference while others experience destructive interference. The adjustment of signals communicated via the antenna elements may include a transmitting device or a receiving device applying certain amplitude and phase offsets to signals carried via each of the antenna elements associated with the device. The adjustments associated with each of the antenna elements may be defined by a beamforming weight set associated with a particular orientation (e.g., with respect to the antenna array of the transmitting device or receiving device, or with respect to some other orientation).

In one example, a base station 105 may use multiple antennas or antenna arrays to conduct beamforming operations for directional communications with a UE 115. For instance, some signals (e.g. synchronization signals, reference signals, beam selection signals, or other control signals) may be transmitted by a base station 105 multiple times in different directions, which may include a signal being transmitted according to different beamforming weight sets associated with different directions of transmission. Transmissions in different beam directions may be used to identify (e.g., by the base station 105 or a receiving device, such as a UE 115) a beam direction for subsequent transmission and/or reception by the base station 105. Some signals, such as data signals associated with a particular receiving device, may be transmitted by a base station 105 in a single beam direction (e.g., a direction associated with the receiving device, such as a UE 115). In some examples, the beam direction associated with transmissions along a single beam direction may be determined based at least in in part on a signal that was transmitted in different beam directions. For example, a UE 115 may receive one or more of the signals transmitted by the base station 105 in different directions, and the UE 115 may report to the base station 105 an indication of the signal it received with a highest signal quality, or an otherwise acceptable signal quality. Although these techniques are described with reference to signals transmitted in one or more directions by a base station 105, a UE 115 may employ similar techniques for transmitting signals multiple times in different directions (e.g., for identifying a beam direction for subsequent transmission or reception by the UE 115), or transmitting a signal in a single direction (e.g., for transmitting data to a receiving device).

A receiving device (e.g., a UE 115, which may be an example of a mmW receiving device) may try multiple receive beams when receiving various signals from the base station 105, such as synchronization signals, reference signals, beam selection signals, or other control signals. For example, a receiving device may try multiple receive directions by receiving via different antenna subarrays, by processing received signals according to different antenna subarrays, by receiving according to different receive beamforming weight sets applied to signals received at a plurality of antenna elements of an antenna array, or by processing received signals according to different receive beamforming weight sets applied to signals received at a plurality of antenna elements of an antenna array, any of which may be referred to as "listening" according to different receive beams or receive directions. In some examples a receiving device may use a single receive beam to receive along a single beam direction (e.g., when receiving a data signal). The single receive beam may be aligned in a beam direction determined based at least in part on listening according to different receive beam directions (e.g., a beam direction determined to have a highest signal strength, highest signal-to-noise ratio, or otherwise acceptable signal quality based at least in part on listening according to multiple beam directions).

In some cases, the antennas of a base station 105 or UE 115 may be located within one or more antenna arrays, which may support MIMO operations, or transmit or receive beamforming. For example, one or more base station antennas or antenna arrays may be co-located at an antenna assembly, such as an antenna tower. In some cases, antennas or antenna arrays associated with a base station 105 may be located in diverse geographic locations. A base station 105 may have an antenna array with a number of rows and columns of antenna ports that the base station 105 may use to support beamforming of communications with a UE 115. Likewise, a UE 115 may have one or more antenna arrays that may support various MIMO or beamforming operations.

In some cases, wireless communications system 100 may be a packet-based network that operate according to a layered protocol stack. In the user plane, communications at the bearer or Packet Data Convergence Protocol (PDCP) layer may be IP-based. A Radio Link Control (RLC) layer may in some cases perform packet segmentation and reassembly to communicate over logical channels. A Medium Access Control (MAC) layer may perform priority handling and multiplexing of logical channels into transport channels. The MAC layer may also use hybrid automatic repeat request (HARQ) to provide retransmission at the MAC layer to improve link efficiency. In the control plane, the Radio Resource Control (RRC) protocol layer may provide establishment, configuration, and maintenance of an RRC connection between a UE 115 and a base station 105 or core network 130 supporting radio bearers for user plane data. At the Physical (PHY) layer, transport channels may be mapped to physical channels.

In some cases, UEs 115 and base stations 105 may support retransmissions of data to increase the likelihood that data is received successfully. HARQ feedback is one technique of increasing the likelihood that data is received correctly over a communication link 125. HARQ may include a combination of error detection (e.g., using a cyclic redundancy check (CRC)), forward error correction (FEC), and retransmission (e.g., automatic repeat request (ARQ)). HARQ may improve throughput at the MAC layer in poor radio conditions (e.g., signal-to-noise conditions). In some cases, a wireless device may support same-slot HARQ feedback, where the device may provide HARQ feedback in a specific slot for data received in a previous symbol in the slot. In other cases, the device may provide HARQ feedback in a subsequent slot, or according to some other time interval.

Time intervals in LTE or NR may be expressed in multiples of a basic time unit, which may, for example, refer to a sampling period of $Ts=1/30,720,000$ seconds. Time intervals of a communications resource may be organized according to radio frames each having a duration of 10 milliseconds (ms), where the frame period may be expressed as $Tf=307,200$ Ts. The radio frames may be identified by a system frame number (SFN) ranging from 0 to 1023. Each frame may include 10 subframes numbered from 0 to 9, and each subframe may have a duration of 1 ms. A subframe may be further divided into 2 slots each having a duration of 0.5 ms, and each slot may contain 6 or 7 modulation symbol periods (e.g., depending on the length of the cyclic prefix prepended to each symbol period). Excluding the cyclic prefix, each symbol period may contain 2048 sampling periods. In some cases, a subframe may be the smallest scheduling unit of the wireless communications system 100, and may be referred to as a transmission time interval (TTI). In other cases, a smallest scheduling unit of the wireless communications system 100 may be shorter than a subframe or may be dynamically selected (e.g., in bursts of shortened TTIs (sTTIs) or in selected component carriers using sTTIs).

In some wireless communications systems, a slot may further be divided into multiple mini-slots containing one or more symbols. In some instances, a symbol of a mini-slot or a mini-slot may be the smallest unit of scheduling. Each symbol may vary in duration depending on the subcarrier spacing or frequency band of operation, for example. Further, some wireless communications systems may implement slot aggregation in which multiple slots or mini-slots are aggregated together and used for communication between a UE 115 and a base station 105.

The term "carrier" refers to a set of radio frequency spectrum resources having a defined physical layer structure for supporting communications over a communication link 125. For example, a carrier of a communication link 125 may include a portion of a radio frequency spectrum band that is operated according to physical layer channels for a given radio access technology. Each physical layer channel may carry user data, control information, or other signaling. A carrier may be associated with a pre-defined frequency channel (e.g., an E-UTRA absolute radio frequency channel number (EARFCN)), and may be positioned according to a channel raster for discovery by UEs 115. Carriers may be downlink or uplink (e.g., in an FDD mode), or be configured to carry downlink and uplink communications (e.g., in a TDD mode). In some examples, signal waveforms transmitted over a carrier may be made up of multiple sub-carriers (e.g., using multi-carrier modulation (MCM) techniques such as OFDM or DFT-s-OFDM).

The organizational structure of the carriers may be different for different radio access technologies (e.g., LTE, LTE-A, LTE-A Pro, NR, etc.). For example, communications over a carrier may be organized according to TTIs or slots, each of which may include user data as well as control information or signaling to support decoding the user data. A carrier may also include dedicated acquisition signaling (e.g., synchronization signals or system information, etc.) and control signaling that coordinates operation for the carrier. In some examples (e.g., in a carrier aggregation configuration), a carrier may also have acquisition signaling or control signaling that coordinates operations for other carriers.

Physical channels may be multiplexed on a carrier according to various techniques. A physical control channel and a physical data channel may be multiplexed on a downlink carrier, for example, using time division multiplexing (TDM) techniques, frequency division multiplexing (FDM) techniques, or hybrid TDM-FDM techniques. In some examples, control information transmitted in a physical control channel may be distributed between different control regions in a cascaded manner (e.g., between a common control region or common search space and one or more UE-specific control regions or UE-specific search spaces).

A carrier may be associated with a particular bandwidth of the radio frequency spectrum, and in some examples the carrier bandwidth may be referred to as a "system bandwidth" of the carrier or the wireless communications system 100. For example, the carrier bandwidth may be one of a number of predetermined bandwidths for carriers of a particular radio access technology (e.g., 1.4, 3, 5, 10, 15, 20, 40, or 80 MHz). In some examples, each served UE 115 may be configured for operating over portions or all of the carrier bandwidth. In other examples, some UEs 115 may be configured for operation using a narrowband protocol type that is associated with a predefined portion or range (e.g., set of subcarriers or RBs) within a carrier (e.g., "in-band" deployment of a narrowband protocol type).

In a system employing MCM techniques, a resource element may consist of one symbol period (e.g., a duration of one modulation symbol) and one subcarrier, where the symbol period and subcarrier spacing are inversely related. The number of bits carried by each resource element may depend on the modulation scheme (e.g., the order of the modulation scheme). Thus, the more resource elements that a UE 115 receives and the higher the order of the modulation scheme, the higher the data rate may be for the UE 115. In MIMO systems, a wireless communications resource may refer to a combination of a radio frequency spectrum resource, a time resource, and a spatial resource (e.g., spatial layers), and the use of multiple spatial layers may further increase the data rate for communications with a UE 115.

Devices of the wireless communications system 100 (e.g., base stations 105 or UEs 115) may have a hardware configuration that supports communications over a particular carrier bandwidth, or may be configurable to support communications over one of a set of carrier bandwidths. In some examples, the wireless communications system 100 may include base stations 105 and/or UEs 115 that can support simultaneous communications via carriers associated with more than one different carrier bandwidth.

Wireless communications system 100 may support communication with a UE 115 on multiple cells or carriers, a feature which may be referred to as carrier aggregation (CA) or multi-carrier operation. A UE 115 may be configured with multiple downlink CCs and one or more uplink CCs according to a carrier aggregation configuration. Carrier aggregation may be used with both FDD and TDD component carriers.

In some cases, wireless communications system 100 may utilize enhanced component carriers (eCCs). An eCC may be characterized by one or more features including wider carrier or frequency channel bandwidth, shorter symbol duration, shorter TTI duration, or modified control channel configuration. In some cases, an eCC may be associated with a carrier aggregation configuration or a dual connectivity configuration (e.g., when multiple serving cells have a suboptimal or non-ideal backhaul link). An eCC may also be configured for use in unlicensed spectrum or shared spectrum (e.g., where more than one operator are allowed to use the spectrum). An eCC characterized by wide carrier bandwidth may include one or more segments that may be utilized by UEs 115 that are not capable of monitoring the whole carrier bandwidth or are otherwise configured to use a limited carrier bandwidth (e.g., to conserve power).

In some cases, an eCC may utilize a different symbol duration than other CCs, which may include use of a reduced symbol duration as compared with symbol durations of the other CCs. A shorter symbol duration may be associated with increased spacing between adjacent subcarriers. A device, such as a UE 115 or base station 105, utilizing eCCs may transmit wideband signals (e.g., according to frequency channel or carrier bandwidths of 20, 40, 60, 80 MHz, etc.) at reduced symbol durations (e.g., 16.67 microseconds). A TTI in eCC may consist of one or multiple symbol periods. In some cases, the TTI duration (that is, the number of symbol periods in a TTI) may be variable.

Wireless communications systems such as an NR system may utilize any combination of licensed, shared, and unlicensed spectrum bands, among others. The flexibility of eCC symbol duration and subcarrier spacing may allow for the use of eCC across multiple spectrums. In some examples, NR shared spectrum may increase spectrum utilization and spectral efficiency, specifically through dynamic vertical (e.g., across the frequency domain) and horizontal (e.g., across the time domain) sharing of resources.

A UE 115 may transmit an AUL transmission to a base station 105 using a configured resource set, the AUL transmission comprising reference signals and data signals. The UE 115 may determine whether a response signal was received from the base station 105 in response to the AUL transmission. The UE 115 may, upon determining that the response signal was received, determining whether the response signal indicates that the base station 105 received the reference signals, or the reference signals and the data signals. The UE 115 may select an uplink transmission scheme to use for subsequent transmissions to the base station 105, the selected uplink transmission scheme based at least in part on the determination of whether the response signal was received from the base station 105 and, if received, whether the response signal indicates that the base station 105 received the reference signals or the reference signals and the data signals.

A base station 105 may detect an AUL transmission from a UE 115 over a configured resource set. The base station 105 may determine whether reference signals or reference signals and data signals are detected in the AUL transmission. The base station 105 may configure, based at least in part on the determining, a response signal for transmission to the UE 115. The base station 105 may transmit the response signal to the UE 115.

Figure 2:
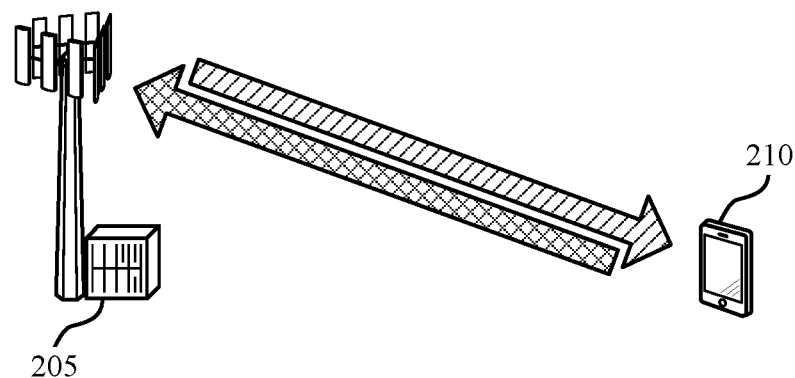
FIG. 2 illustrates an example of a wireless communication system that supports retransmission and fallback for AUL transmission in accordance with aspects of the present disclosure.

FIG. 2 illustrates an example of a wireless communication system 200 that supports retransmission and fallback for AUL transmission in accordance with aspects of the present disclosure. In some examples, wireless communication system 200 may implement aspects of wireless communication system 100. Wireless communication system 200 may include a base station 205 and a UE 210, which may be examples of the corresponding devices described herein.

Wireless communication system 200 may implement one or more transmission schemes that support uplink and/or downlink transmissions between base station 205 and UE 210. The transmission schemes may include legacy transmission schemes and/or non-legacy (e.g., NR) transmission schemes. Some transmission schemes may support uplink transmissions based on a random access procedure. One example legacy transmission scheme may support a four-step uplink random access procedure that allows data transmission in Msg5 of the random access procedure. Another example legacy transmission scheme may support early data transmission (EDT), which generally utilizes a two-step uplink access procedure that allows data transmission in Msg3 of the random access procedure.

Another example transmission scheme may support uplink data transmissions in Msg1 using configured resources. For example, this transmission scheme may be supported when the UE 210 has a valid TA, such as when the UE 210 is stationary. This transmission scheme may also be considered a grantless transmission (e.g., AUL transmission) in that at least some of the resources are configured for UE 210, rather than being granted to UE 210 for the AUL transmission.

Accordingly, UE 210 may be configured to transmit an AUL transmission to base station 205 using a configured resource set. The configured resource set may be selected from a set of available configured resource set. For example, base station 205 and/or a network entity may configure a plurality of configured resource sets for UEs (such as UE 210) to use for performing AUL transmissions. UE 210 may randomly select from the plurality of configured resource sets when performing an AUL uplink transmission and/or select from the plurality of configured resource sets based on other conditions, e.g., a traffic congestion level, an interference level, a channel quality level, etc. In some aspects, UE 210 may select from the plurality of configured resource sets based on an identifier associated with UE 210, based on a timing parameter (e.g., within a window period), based on previous AUL transmissions, and the like.

Each configured resource set may include time/frequency resources for UE 210 to use for the grantless or AUL transmission. In some aspects, the configured resource set may be used by the UEs (such as UE 210) for transmitting reference signals (e.g., DMRS) as well as data. In some aspects, the configured resource set may be based on, or otherwise associated with, an identifier of the reference signals. For example, each reference signal (e.g., DMRS) may have an associated index (e.g., DMRS sequence) that UE 210 selects when selecting the configured resource set. Each DMRS sequence in a configured resource set may be associated with a certain comb (e.g., selection of channels within a bandwidth), with an orthogonal cover code (OCC), with a frequency or cyclic shift, and the like. In selecting a particular reference signal identifier (e.g., DMRS sequence), UE 210 may automatically use resources linked or otherwise associated with the reference signal identifier to transmit data signals. As this link is configured, a base station (such as base station 205) receiving DMRSs from UE 210 automatically knows that UE 210 is performing an AUL transmission on a particular configured resource set. Accordingly, base station 205 may use the reference signals to determine the channel conditions, and then use the channel conditions to detect and decode the associated data signals. However, not every AUL transmission will be successful and, therefore, UE 210 may utilize aspects of the described techniques to select a transmission scheme to use for communicating with base station 205 based on the response it receives from the base station, if any.

In some aspects, the AUL transmission from UE 210 may have a variety of possible outcomes (which is referred to as cases below for ease of reference), and base station 205 may respond differently for each case.

In case one, base station 205 may not detect the transmission of the DMRS sequence. Accordingly, this case may imply that base station 205 cannot detect any data signals associated with UE 210 using that DMRS sequence. In this case, base station 205 may not be aware that UE 210 is performing the AUL transmission and may therefore not provide any response signal to UE 210, e.g., base station 205 may not be able to provide a negative acknowledgement (NACK) response signal associated with the DMRS sequence as the sequence is not detected. The lack of any sort of ACK/NACK from base station 205 (tied to the DMRS sequence) may be an implicit indication to UE 210 that the AUL transmission has failed. In this case, UE 210 may wait for a certain period (within which it expects to receive any possible response from base station 205) before taking further action. In some aspects, the waiting period may be deterministic or probabilistic (e.g., at least ≥ACK/NACK reception time). In some aspects, the waiting period may be similar to a random access response (RAR) window in legacy random access, e.g., it may be the same as legacy random access and/or it may be signaled separately from a legacy RAR window and configured per coverage enhancement (CE) level. Upon expiration of the waiting period, UE 210 may employ the following options. In a first option, UE 210 may adopt or otherwise select an uplink transmission scheme that involves retransmitting the AUL transmission on the same configured resource set or using a different (e.g., updated) configured resource set (e.g., modulo resource periodicity) with the same or different DMRS. The retransmission in this option may include UE 210 using a power ramp up (e.g., different transmission attempts may use different, possibly increased, power ramp up values). In a second option, UE 210 may adopt or otherwise select an uplink transmission scheme where UE 210 falls back to an EDT transmission, a legacy random access, etc. This decision may be based on the number of retransmissions attempted by UE 210, the power-level used by UE 210 exceeding a certain threshold, and the like.

In case two, base station 205 may successfully detect the transmission of the DMRS sequence (e.g., reference signals)

from UE 210, but determine that multiple UEs are using the same DMRS sequence. For example, this may be determined at base station 205 by or based on the received signal-to-noise ratio (SNR) of the DMRS (e.g., an unrealistically high SNR for transmission from only one UE), based on a relative SNR between DMRS and data (e.g., high SNR in DMRS and low SNR in data signals), based on a presence of multiple non-collocated peaks at the output of the DMRS correlator, and/or based on an inability to decode the data signal using the DMRS in spite of a high received SNR for the DMRS. Case two may also imply that base station 205 cannot decode the data signals associated with UE 210 using that DMRS sequence.

Accordingly, base station 205 may transmit a response signal that carries or otherwise conveys an indication of an identifier associated with the reference signals (e.g., the DMRS sequence). In a first option, base station 205 may send a backoff-and-retransmit indicator to UEs using this DMRS sequence. The indication may be tied to the DMRS sequence, or an identifier that is indicative of the DMRS sequence. The indication may implicitly or explicitly signal for DMRS reselection to UEs using this DMRS sequence. The DMRS reselection may be left to the UEs (to essentially randomly and independently select again from the plurality of configured resource sets). In some examples, the indication may point to a pool of DMRS sequences, e.g., configured resource sets, that base station 205 has determined are less congested.

In a second option, base station 205 may transmit a response signal that is an advanced response to the UEs using the DMRS. The response signal may include or otherwise indicate a new set of DMRSs and/or data resources (and associated DMRS sequences) for the UEs to use to retransmit their respective AUL transmissions in. For example, this set of configured resource sets may have a larger bandwidth and/or a larger timespan than the initial configured resource set. As another example, this set may have a larger number of orthogonal resources than the initial configured resource set, e.g., to reduce congestion. In some aspects, a power control command may be included or otherwise indicated in the response signal. The power control command may be for the UEs to use for the retransmission, e.g., an indication to not ramp up power further.

In a third option, base station 205 may transmit a response signal that is a fallback indication to all UEs tied to the DMRS sequence. The fallback may be to an EDT or other legacy random access transmission scheme (e.g., a PRACH based transmission scheme). Whether base station 205 sends this type of response signal may depend on the number of colliding UEs (e.g., related to the congestion level in the network). The response signal may indicate a hard fallback or a soft fallback. A hard fallback may be indicated when base station 205 cannot guarantee that the TA of all UEs transmitting using the DMRS sequence are valid (e.g., within the delay spread of the channel). Base station 205 may determine this from the location of peaks in its correlator output for DMRS processing. In some aspects, a hard fallback may refer to starting the EDT/legacy random access procedures from scratch, e.g., directing the UEs using this DMRS sequence to begin the random access procedure from the first step. If all UEs using the DMRS have valid TAs, base station 205 may direct the UEs to directly send data in an EDT transmission scheme in the next uplink transmission or direct the UE to send a legacy Msg3 for legacy random access (e.g., perform a "soft fallback").

Based on receiving the response signal indicating the identifier associated with the reference signals (e.g., that base station 205 received the reference signals), UE 210 may adopt or otherwise select an uplink transmission scheme that includes a variety of options. For example, UE 210 may select an updated configured resource set to use for retransmitting the AUL transmission. In some aspects, UE 210 may decode the response signal to determine an identifier for the updated configured resource set. In some aspects, UE 210 may select a legacy transmission scheme (e.g., hard fallback or soft fallback) to use for retransmitting the AUL transmission.

In case three, base station 205 may successfully detect the transmission of the DMRS sequence from one associated UE (e.g., UE 210), but may fail to decode the associated data signals. In this case, base station 205 may have several options on how to configure the response signal. In some aspects, the response signal in this case may also be based on the identifier associated with the reference signals (e.g., the DMRS sequence that UE 210 uses for the initial AUL transmission). In a first option, base station 205 may operate in an "ACK" only mode where it doesn't send any response signal unless data is detected. In this option and from the perspective of UE 210, failure to receive the ACK response signal may be used by UE 210 as an indication that the AUL transmission was unsuccessful. In a second option, base station 205 may configure the response signal to include or otherwise convey an indication of a NACK, such as a PHICH type NACK, in a Msg3 to UE 210. UE 210 may retransmit using the same DMRS sequence (e.g., the original configured resource set) and linked data resources (e.g., modulo resource periodicity).

In a third option, base station 205 may configure the response signal as an advanced response signal. UE 210 may use one or more bits of information, alone or in any combination, indicated in the response signal when selecting an uplink transmission scheme to use for retransmitting the AUL transmission. In some aspects, the response signal may carry or otherwise indicate a NACK signal. In some aspects, the response signal may carry or otherwise indicate a DMRS-specific backoff indicator. In some aspects, the response signal may carry or otherwise indicate a DMRS-specific TA update/invalidity indication. In some aspects, the response signal may carry or otherwise indicate a DMRS-specific power control update indication (e.g., a power ramp up indication). In some aspects, this power control indication may be separately signaled for DMRS and data signals, e.g., since DMRS is already decodable, only a power ramp up for the data signals may be indicated. In some aspects, the response signal may carry or otherwise indicate a DMRS-specific transport block size (TBS) limitation/update indicator, e.g., an indication to reduce the TBS for data to increase the probability of detection in the retransmission. In some aspects, the response signal may carry or otherwise indicate a DMRS-specific redundancy version (RV) indicator for retransmission. The RV indication may be based on whether the power ramp up is indicated, whether the TBS has been updated (e.g., the RV indicated may be reset if there is a power ramp up or TBS reduction), and the like. In some aspects, the response signal may carry or otherwise indicate an updated/restriction on the number of cyclic shifts that may be allowed for DMRS sequences. In some aspects, the response signal may carry or otherwise indicate a DMRS radio network temporary identifier (RNTI) for UE 210 to use when scrambling data for subsequent transmission. In some aspects, the response signal may carry or otherwise indicate a retransmission request using the same configured resource set, but with updated parameters. In some aspects, the response signal may carry or otherwise indicate a new grant for UE 210 to use for the retransmission. For example, the new grant may be in a different (possibly less congested) region of the configured resource set to use for Msg1 data. As another example, the new grant may be a grant to a separate pool of resources, e.g., for a contention-free (dedicated) resources, for shared (for multiple UEs) resources, and the like. As another example, the grant may indicate that the data (e.g., PUSCH) format may be different from the format used for uplink Msg1 data (e.g., with respect to the number of DMRSs). For example, if a contention-free grant is indicated, a legacy PUSCH structure may be used for the retransmission.

In a fourth option, base station 205 may configure the response signal to indicate an advanced fallback to EDT/legacy random access. The fallback may be a hard fallback, e.g., to EDT/legacy random access procedures where UE 210 starts from scratch. This may happen if base station 205 determines that the TA is invalid, e.g., the TA offset determined from the DMRS (with respect to a valid TA) falls outside a detectable time window. The fallback may be a soft fallback which improves uplink access efficiency. This may happen if base station 205 can verify and/or correct any offset in the TA of UE 210. For example, the response signal (e.g., sent in DCI/Msg2) may contain a TA update and direct UE 210 to enter an EDT mode (in an assigned EDT resource) to use in the next UE 210 transmission (e.g., in Msg3). As another example, the response signal (e.g., sent in DCI/Msg2) may contain a TA update indication, and essentially function as a RAR for a legacy random access procedure. This will direct UE 210 to send a legacy Msg3 for legacy random access in the next step.

Finally, case four may include base station 205 successfully detecting the transmission of the DMRS sequence from one associated UE (e.g., UE 210) and successfully decoding the associated data signals. In this case, base station 205 may configure the response signal to indicate an ACK for the AUL transmission. The ACK may implicitly indicate that base station 205 determined the UE 210 identifier correctly from the payload (e.g., data signal) and resolved any contention.

In some aspects, a new base station 205 response (e.g., the response signal) to uplink Msg1 data transmission (e.g., the AUL transmission) may be sent (in part or wholly) on PDCCH and/or PDSCH, e.g., using layer 1 signaling or a combination of layer 2/layer 3 signaling. For any of the described cases, UE 210 may be configured to support detection of the response signal from base station 205 using several options. In a first option, the response signal may be based on a "resource RNTI." For example, all UEs that use the same data resources (but use possibly different DMRSs) may have a same "resource RNTI." These UEs then monitor for this RNTI (in PDCCH) which contains a list of DMRS-IDs (or UE-IDs—such as system architecture evolution (SAE) temporary mobile subscriber identity (sTMSI)—if contention resolution succeeds, or some ID related to the DMRS). Additionally or alternatively, the list of DMRS-ID and/or sTMSI/contention resolution ID may be transmitted in PDSCH, and the PDCCH with the resource RNTI may just have scheduling information for PDSCH. The resource RNTI may direct the UEs to further dedicate response locations (DMRS-ID/UE-ID specific) in PDSCH. In a second option, the response signal detection may be based on a DMRS-RNTI. For example, the pair {resource, DMRS-ID}, or {DMRS-ID} by itself, may be used to generate a "DMRS RNTI." The response (in PDCCH) may be directed only to the UE(s) that transmitted that particular DMRS. An alternative may include the PDCCH pointing to a PDSCH, which may contain the contention resolution ID and/or downlink non-access stratum (NAS) protocol data unit (PDU). In a third option, this may include the response signal being based on both resource RNTI and DMRS RNTI. UEs may monitor for both a resource RNTI and a DMRS-RNTI (or temporary RNTI) in PDCCH. As a first example, the resource RNTI may be used for a common backoff for all UEs, while the DMRS RNTI may be used for a contention resolution. As a second example, the scrambling for the downlink payload may be based on the resource RNTI, but the downlink cyclic redundancy check (CRC) may be scrambled by either DMRS or resource RNTI, and both DCIs may have the same size regardless of CRC scramble (this way the complexity in terms of the number of blind decoding attempts is not increased).

In some aspects, a new DCI format may be employed to transmit the base station 205 response signal to UE 210 in response to uplink Msg1 data (e.g., in response to the AUL transmission). Alternatively, an existing DCI format may be used, but with different field interpretation, may be reused.

Based on the response signal received from base station 205, if any, and what the response signal indicates (implicitly and/or explicitly), UE 210 may select an uplink transmission scheme to use for subsequent transmissions to base station 205. Generally, the selected uplink transmission scheme may be used to retransmit the AUL transmission (e.g., using an updated configured resource set and/or a legacy transmission scheme) when the initial transmission fails, or to use for continued communications with base station 205 when the initial AUL transmission is successful. Thus, the transmission scheme selected by UE 210 may use the configured resources (e.g., as is used for the initial AUL transmission), updated configured resources (e.g., changing one or more parameters of the configured resource set and/or pointing to a new resource set in the configured resource set), and/or using completely different resources (e.g., such as in a fallback situation where UE 210 is directed to a legacy transmission scheme using some, all, or none of the resources in the configured resource set).

Figure 3:
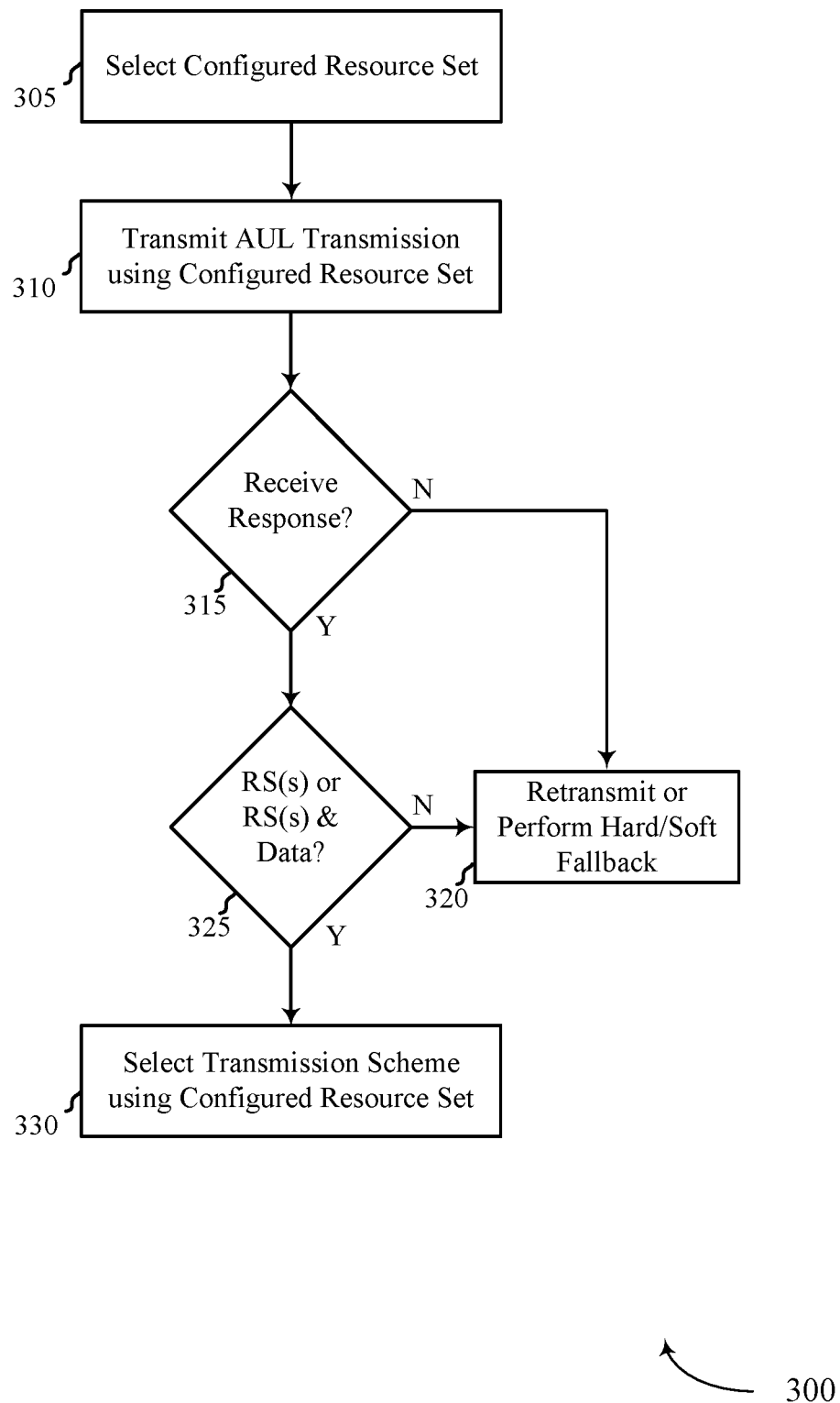
FIG. 3 illustrates an example of a method that supports retransmission and fallback for AUL transmission in accordance with aspects of the present disclosure.

FIG. 3 illustrates an example of a method 300 that supports retransmission and fallback for AUL transmission in accordance with aspects of the present disclosure. In some examples, method 300 may implement aspects of wireless communication systems 100/200. Aspects of method 300 may be implemented by a UE and/or a base station, which may be examples of the corresponding devices described herein.

At 305, the UE may select a configured resource set to use for performing an AUL transmission to a base station. The configured resource set may be selected from a plurality of resource sets that are configured for the UE. The configured resource set may include time/frequency/code/etc. resources that the UE will use for the AUL transmission. The configured resource set may include resources for transmitting reference signals (e.g., DMRS) and data signals during the AUL transmission.

At 310, the UE may perform the AUL transmission using the selected configured resource set. As the UE uses configured resource set for the AUL transmission, the base station may not know beforehand that the AUL transmission has occurred. Instead, the base station may be configured to monitor for the DMRS signals at the resources corresponding to the configured resource set to determine whether the UE is performing an AUL transmission. The base station may receive none, some, or all of the AUL transmission, and respond accordingly.

At 315, the UE may determine whether any response signal was received from the base station. The UE may not receive a response signal in case one where the base station does not detect the reference signals (e.g., DMRS) in the AUL transmission. The UE may also not receive a response signal when the base station receives the reference signals, but is operating in an ACK only mode and cannot successfully detect the data signals portion of the AUL transmission.

If no response signal is received, at 320 the UE may retransmit the AUL transmission using the same or different configured resources, or may perform a fallback procedure (e.g., soft or hard fallback procedure) to a legacy transmission scheme to transmit the data to the base station.

If a response signal was received, at 325 the UE may determine whether the response signal indicates (implicitly or explicitly) that the base station received the reference signals portion of the AUL transmission or both the reference signals and the data signals. In some examples, the response signal may be linked or otherwise tied to an identifier associated with the reference signals (e.g., a DMRS sequence). The response signal may indicate that the base station received the reference signal from the UE and one or more additional UEs (e.g., case two) or just from the UE (e.g., case three). In some aspects, the response signal may be configured to indicate an updated configured resource set, a fallback indication (hard or soft fallback), an ACK/NACK indication, and the like, as is described with respect to cases two and three above.

If the response signal indicates that the base station received the reference signals only (e.g., not the associated data signals), the UE may again move to 320 and retransmit the AUL transmission using the same or different configured resources, or may perform a fallback procedure to a legacy transmission scheme. In this case, however, the UE may perform the retransmission and/or fallback based on some or all of the indications provided in the response signal, e.g., the base station may help the UE ensure that the retransmission is successful.

If the response signal indicates that the base station received both the reference signals and the data signals, at 330 the UE may select a transmission scheme that uses the configured resource set. For example, the response signal may simply be an ACK, which signals to the UE that the configured resource set can be used for continued transmissions to the base station. It is to be understood, however, that the UE can change to a different or updated configured resource set based on various factors, e.g., mobility of the UE, channel performance, etc.

Figure 4:
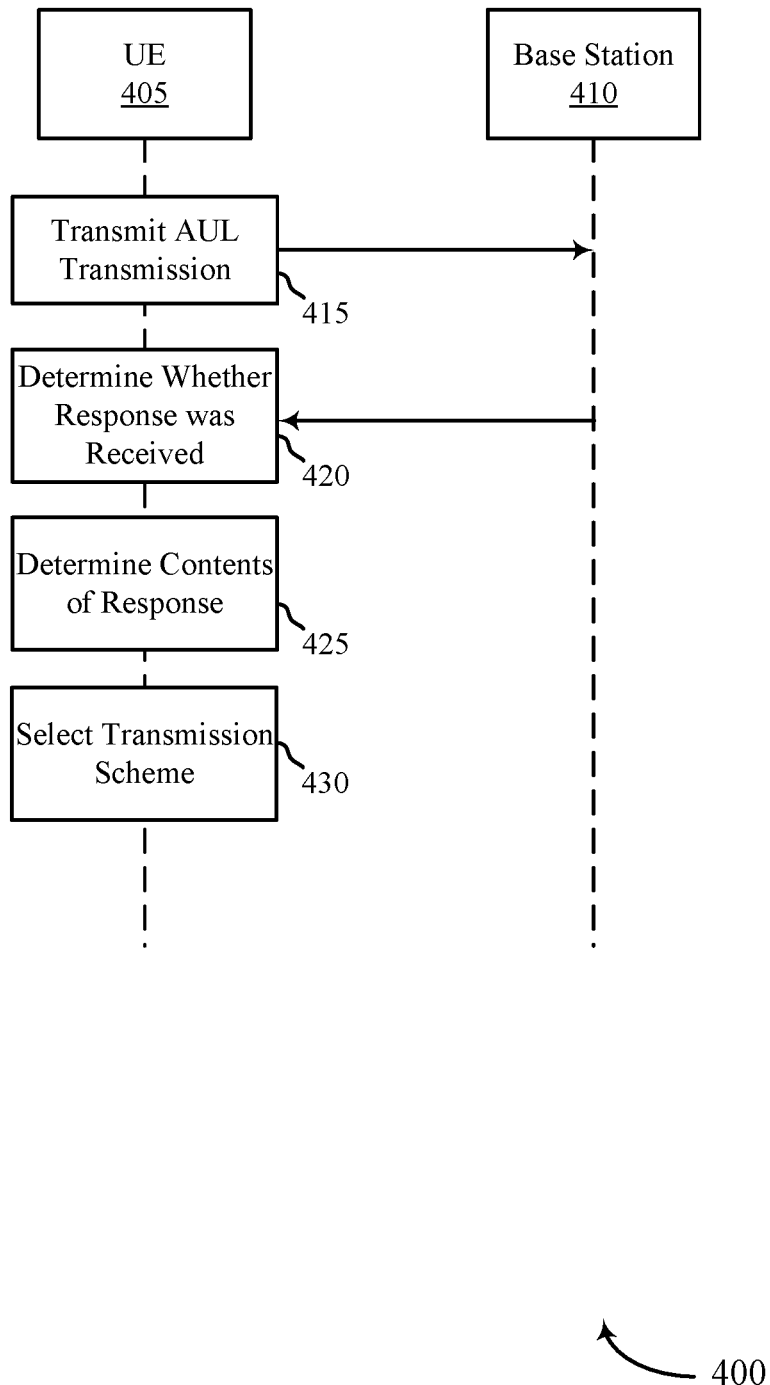
FIG. 4 illustrates an example of a process that supports retransmission and fallback for AUL transmission in accordance with aspects of the present disclosure.

FIG. 4 illustrates an example of a process 400 that supports retransmission and fallback for AUL transmission in accordance with aspects of the present disclosure. In some examples, process 400 may implement aspects of wireless communication systems 100/200 and/or method 300. Aspects of process 400 may be implemented by UE 405 and/or base station 410, which may be examples of the corresponding devices described herein.

At 415, UE 405 may transmit (and base station 410 may receive, in some cases) an AUL transmission using a configured resource set. In some aspects, the AUL transmission may include reference signals (e.g., DMRS) and associated data signals.

At 420, UE 405 may determine whether a response signal was received from base station 410. Although process 400 shows a response signal being received, it is to be understood that in some cases (e.g., case one) base station 410 may not receive any portion of the AUL transmission and may therefore not provide a response signal. In some aspects, UE 405 may wait for a certain time window or response window before determining that no response signal was received from base station 410.

As one example where UE 405 determines that no response signal was received from base station 410, UE 405 may perform a retransmission of the AUL transmission using the same or using a different configured resource set. In some aspects, UE 405 may use a power ramp up for retransmission of the AUL transmission. In some aspects, UE 405 may select a legacy uplink transmission scheme to use to retransmit the AUL transmission.

At 425, upon determining that a response signal was received, UE 405 may determine whether the response signal indicates that base station 410 received the reference signals or received the reference signals and the data signals.

In some aspects, this may include UE 405 determining that the base station received the reference signals, but not the data signals. In some aspects, the response signal may be based on an identifier (e.g. DMRS sequence) associated with the reference signals. In some aspects, the response signal may be configured by base station 410 to indicate (implicitly or explicitly) an updated configured resource set, an updated parameter for the configured resource set, a NACK indicator, a retransmission indicator, a fallback indicator (hard or soft fallback), and the like.

In some aspects, this may include UE 405 determining that the base station 410 received the reference signals and the data signals. For example, base station 410 may configure the response signal to indicate an ACK indicator.

At 430, UE 405 may select an uplink transmission scheme to use for subsequent transmissions to base station 410 (e.g., for retransmission of the AUL transmission and/or for continued communications with a base station 410). In some aspects, UV 405 may select the uplink transmission scheme based on whether the response signal was received or, if so, whether the response signal indicated that base station 410 received the reference signals or received the reference signals and the data signals.

Figure 5:
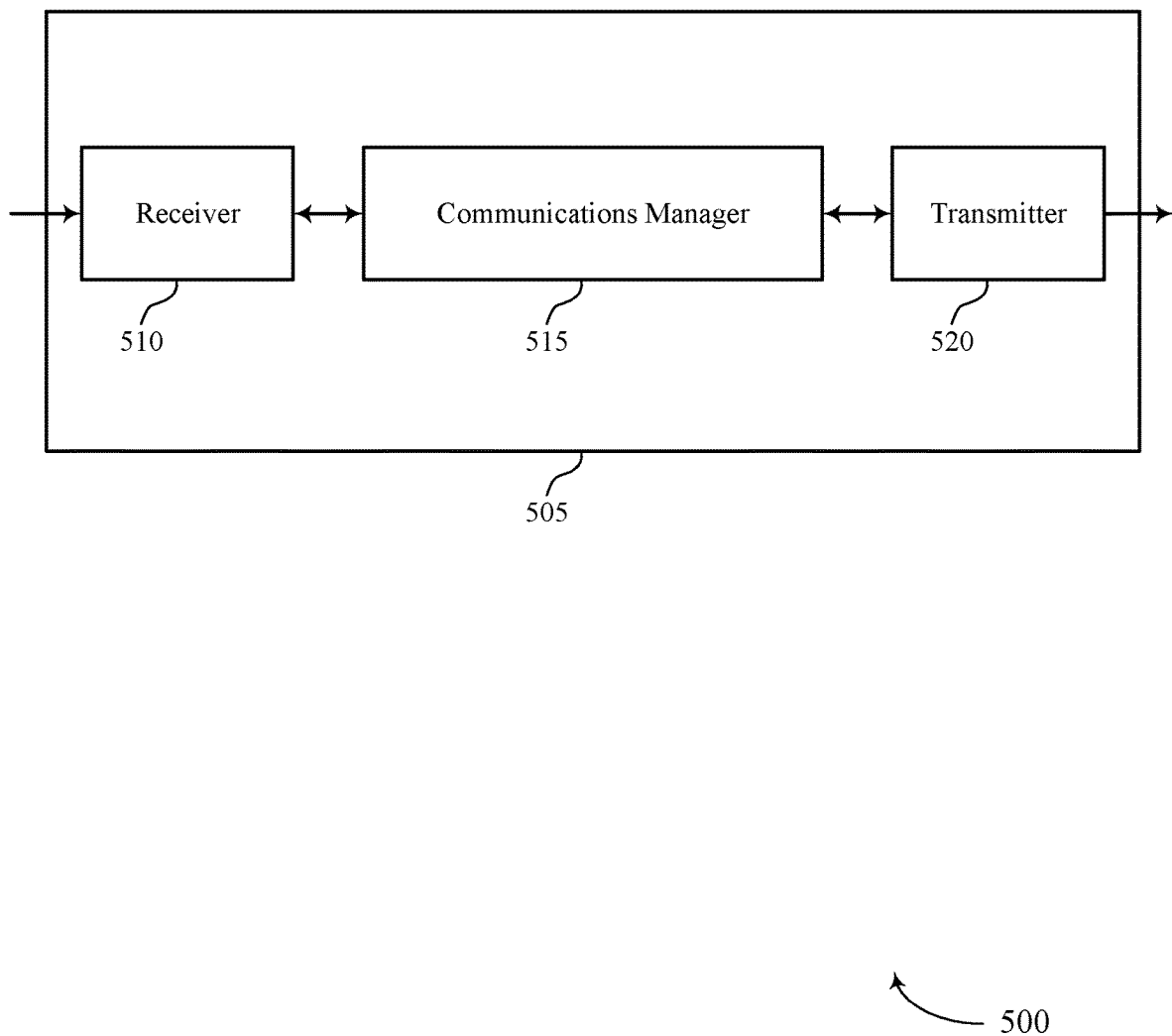
FIGS. 5 and 6 show block diagrams of devices that support retransmission and fallback for AUL transmission in accordance with aspects of the present disclosure.

FIG. 5 shows a block diagram 500 of a device 505 that supports retransmission and fallback for AUL transmission in accordance with aspects of the present disclosure. The device 505 may be an example of aspects of a UE 115 as described herein. The device 505 may include a receiver 510, a communications manager 515, and a transmitter 520. The device 505 may also include a processor. Each of these components may be in communication with one another (e.g., via one or more buses).

The receiver 510 may receive information such as packets, user data, or control information associated with various information channels (e.g., control channels, data channels, and information related to retransmission and fallback for AUL transmission, etc.). Information may be passed on to other components of the device 505. The receiver 510 may be an example of aspects of the transceiver 820 described with reference to FIG. 8. The receiver 510 may utilize a single antenna or a set of antennas.

The communications manager 515 may transmit an autonomous uplink transmission to a base station using a configured resource set, the AUL transmission including reference signals and data signals, determine whether a response signal was received from the base station in response to the AUL transmission, upon determining that the response signal was received, determining whether the response signal indicates that the base station received the reference signals, or the reference signals and the data signals, and select an uplink transmission scheme to use for subsequent transmissions to the base station, the selected uplink transmission scheme based on the determination of whether the response signal was received from the base station and whether the response signal indicates that the base station received the reference signals or the reference signals and the data signals. The communications manager 515 may be an example of aspects of the communications manager 810 described herein.

The communications manager 515, or its sub-components, may be implemented in hardware, code (e.g., software or firmware) executed by a processor, or any combination thereof. If implemented in code executed by a processor, the functions of the communications manager 515, or its sub-components may be executed by a general-purpose processor, a DSP, an application-specific integrated circuit (ASIC), a FPGA or other programmable logic device, discrete gate or transistor logic, discrete hardware components, or any combination thereof designed to perform the functions described in the present disclosure.

The communications manager 515, or its sub-components, may be physically located at various positions, including being distributed such that portions of functions are implemented at different physical locations by one or more physical components. In some examples, the communications manager 515, or its sub-components, may be a separate and distinct component in accordance with various aspects of the present disclosure. In some examples, the communications manager 515, or its sub-components, may be combined with one or more other hardware components, including but not limited to an input/output (I/O) component, a transceiver, a network server, another computing device, one or more other components described in the present disclosure, or a combination thereof in accordance with various aspects of the present disclosure.

The transmitter 520 may transmit signals generated by other components of the device 505. In some examples, the transmitter 520 may be collocated with a receiver 510 in a transceiver module. For example, the transmitter 520 may be an example of aspects of the transceiver 820 described with reference to FIG. 8. The transmitter 520 may utilize a single antenna or a set of antennas.

Figure 6:
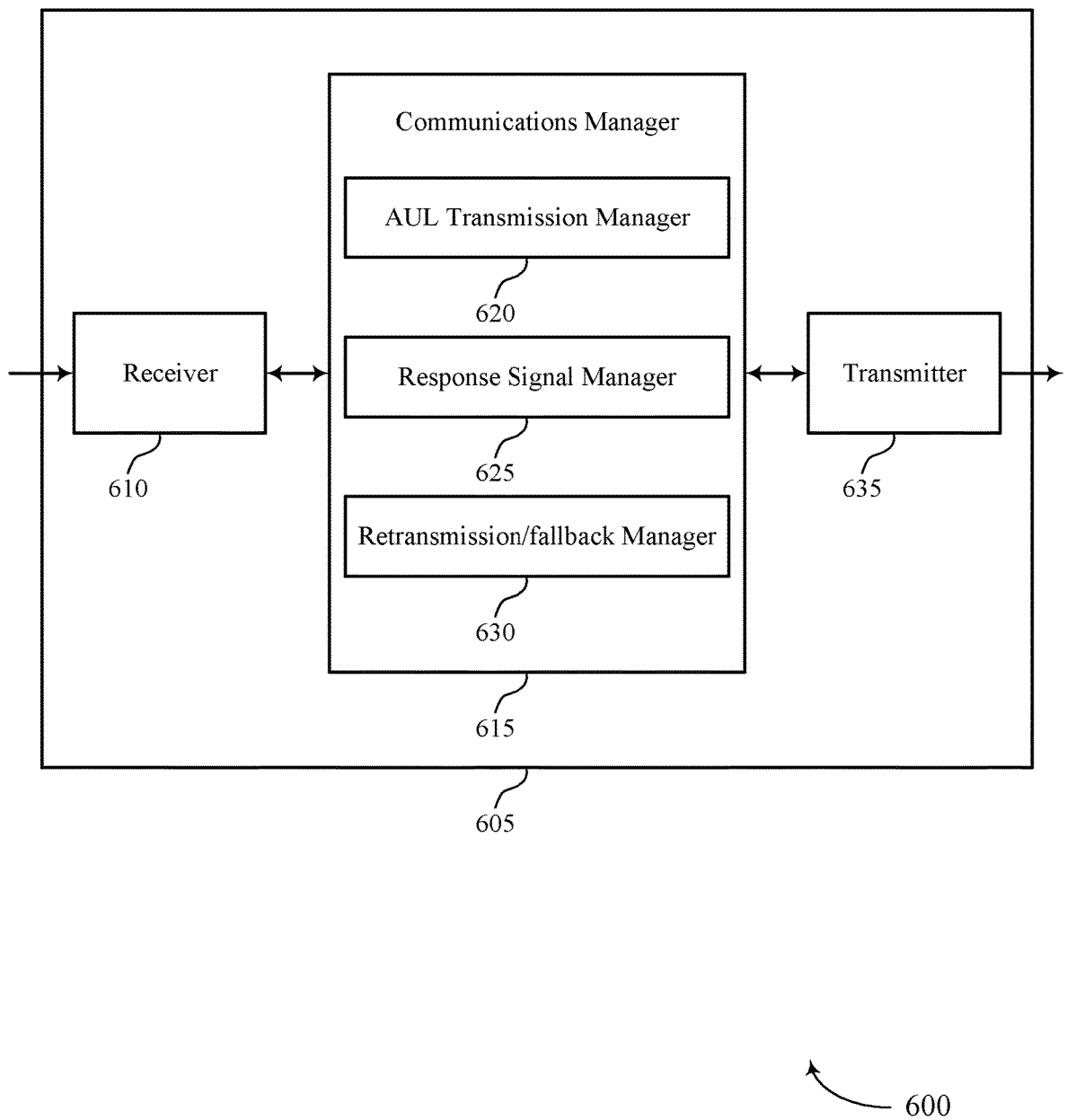

FIG. 6 shows a block diagram 600 of a device 605 that supports retransmission and fallback for AUL transmission in accordance with aspects of the present disclosure. The device 605 may be an example of aspects of a device 505 or a UE 115 as described herein. The device 605 may include a receiver 610, a communications manager 615, and a transmitter 635. The device 605 may also include a processor. Each of these components may be in communication with one another (e.g., via one or more buses).

The receiver 610 may receive information such as packets, user data, or control information associated with various information channels (e.g., control channels, data channels, and information related to retransmission and fallback for AUL transmission, etc.). Information may be passed on to other components of the device 605. The receiver 610 may be an example of aspects of the transceiver 820 described with reference to FIG. 8. The receiver 610 may utilize a single antenna or a set of antennas.

The communications manager 615 may be an example of aspects of the communications manager 515 as described herein. The communications manager 615 may include an AUL transmission manager 620, a response signal manager 625, and a retransmission/fallback manager 630. The communications manager 615 may be an example of aspects of the communications manager 810 described herein.

The AUL transmission manager 620 may transmit an AUL transmission to a base station using a configured resource set, the AUL transmission including reference signals and data signals.

The response signal manager 625 may determine whether a response signal was received from the base station in response to the AUL transmission and upon determining that the response signal was received, determining whether the response signal indicates that the base station received the reference signals, or the reference signals and the data signals.

The retransmission/fallback manager 630 may select an uplink transmission scheme to use for subsequent transmissions to the base station, the selected uplink transmission scheme based on the determination of whether the response signal was received from the base station and whether the response signal indicates that the base station received the reference signals or the reference signals and the data signals.

The transmitter 635 may transmit signals generated by other components of the device 605. In some examples, the transmitter 635 may be collocated with a receiver 610 in a transceiver module. For example, the transmitter 635 may be an example of aspects of the transceiver 820 described with reference to FIG. 8. The transmitter 635 may utilize a single antenna or a set of antennas.

Figure 7:
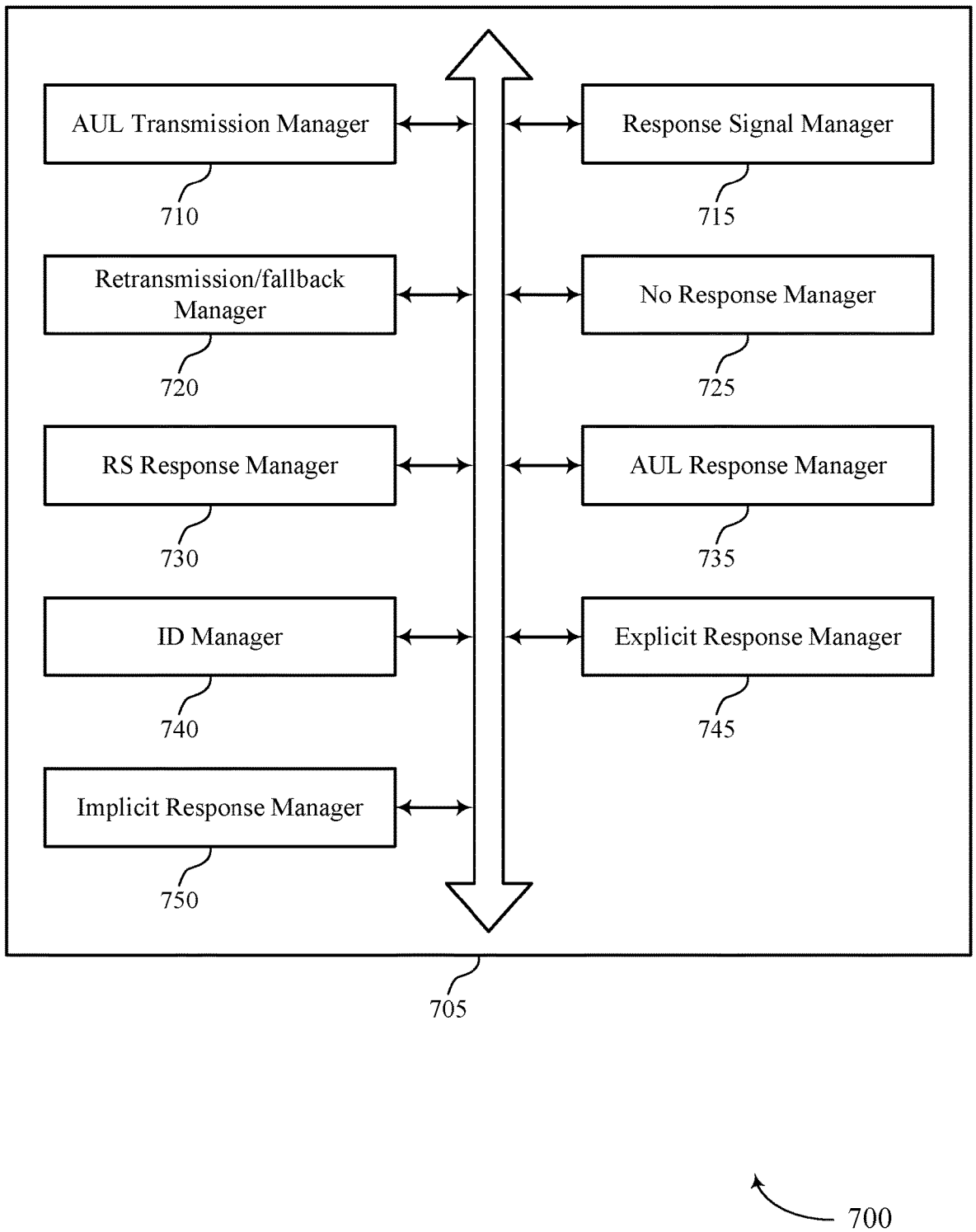
FIG. 7 shows a block diagram of a communications manager that supports retransmission and fallback for AUL transmission in accordance with aspects of the present disclosure.

FIG. 7 shows a block diagram 700 of a communications manager 705 that supports retransmission and fallback for AUL transmission in accordance with aspects of the present disclosure. The communications manager 705 may be an example of aspects of a communications manager 515, a communications manager 615, or a communications manager 810 described herein. The communications manager 705 may include an AUL transmission manager 710, a response signal manager 715, a retransmission/fallback manager 720, a no response manager 725, a RS response manager 730, an AUL response manager 735, an ID manager 740, an explicit response manager 745, and an implicit response manager 750. Each of these modules may communicate, directly or indirectly, with one another (e.g., via one or more buses).

The AUL transmission manager 710 may transmit an AUL transmission to a base station using a configured resource set, the AUL transmission including reference signals and data signals. In some aspects, the AUL transmission includes a message one (Msg1) of a random access procedure.

The response signal manager 715 may determine whether a response signal was received from the base station in response to the AUL transmission. In some examples, the response signal manager 715 may upon determining that the response signal was received, determining whether the response signal indicates that the base station received the reference signals, or the reference signals and the data signals.

The retransmission/fallback manager 720 may select an uplink transmission scheme to use for subsequent transmissions to the base station, the selected uplink transmission scheme based on the determination of whether the response signal was received from the base station and whether the response signal indicates that the base station received the reference signals or the reference signals and the data signals.

The no response manager 725 may determine that no response signal was received from the base station. In some examples, the no response manager 725 may perform a retransmission of the AUL transmission using the configured resource set or using a different configured resource set. In some examples, the no response manager 725 may perform a power ramp-up procedure for the retransmission of the AUL transmission. In some examples, the no response manager 725 may select a legacy uplink transmission scheme to use to retransmit the AUL transmission.

In some cases, the determining that no response signal was received from the base station is based on a determination that no response signal was received within a response window. In some cases, the response window is based on an ACK/NACK response window, a random access response window, or a combination thereof.

The RS response manager 730 may determine that the response signal was received from the base station, where the response signal indicates that the base station received the reference signals, where the indication is based on an identifier associated with the reference signals. In some examples, the RS response manager 730 may select, based on the indication, an updated configured resource set to use for retransmitting the AUL transmission. In some examples, the RS response manager 730 may retransmit the AUL transmission using the updated configured resource set. In some examples, the RS response manager 730 may decode the response signal to determine an identifier for an updated configured resource set to use for retransmitting the AUL transmission.

In some examples, the RS response manager 730 may select, based on the identifier, the updated configured resource set to use for retransmitting the AUL transmission. In some examples, the RS response manager 730 may select, based on the power control command, a transmit power to use for the retransmission of the AUL transmission. In some examples, the RS response manager 730 may select, based on the fallback indicator, a legacy transmission scheme to use for retransmitting the AUL transmission. In some examples, the RS response manager 730 may skip, based on the fallback indicator, a first portion of the legacy transmission scheme when retransmitting the AUL transmission. In some examples, the RS response manager 730 may determine that the response signal was received from the base station, where the response signal indicates that the base station received the reference signals.

In some examples, the RS response manager 730 may determine that the response signal conveys a NACK indicator. In some examples, the RS response manager 730 may perform a retransmission of the AUL transmission using the configured resources. In some examples, the response signal includes at least one of a backoff indicator, or a timing advance indicator, or a power control command, or a transport block size update indicator, or a redundancy version indicator, or a cyclic shift indicator, or an updated scrambling sequence indicator, or a retransmission request, or a resource grant for an updated configured resource set, or a combination thereof, to use for performing a retransmission of the AUL transmission. In some cases, the updated configured resource set includes at least one of a larger bandwidth parameter, a larger transmission window parameter, a larger resource set, or a combination thereof, than the configured resource set.

The AUL response manager 735 may select, based on the ACK indicator, a transmission scheme that uses the configured resource set for subsequent transmissions to the base station.

The ID manager 740 may determine whether the response signal was received from the base station based on an identifier associated with the configured resource set, on an identifier associated with the reference signals, or a combination thereof.

The explicit response manager 745 may decode one or more bits or fields in the response signal to determine whether the response signal indicates that the base station received the reference signals or the reference signals and the data signals.

The implicit response manager 750 may identify, based on the response signal, an updated configured resource set, where the updated configured resource set indicates whether the response signal indicates that the base station received the reference signals or the reference signals and the data signals.

Figure 8:
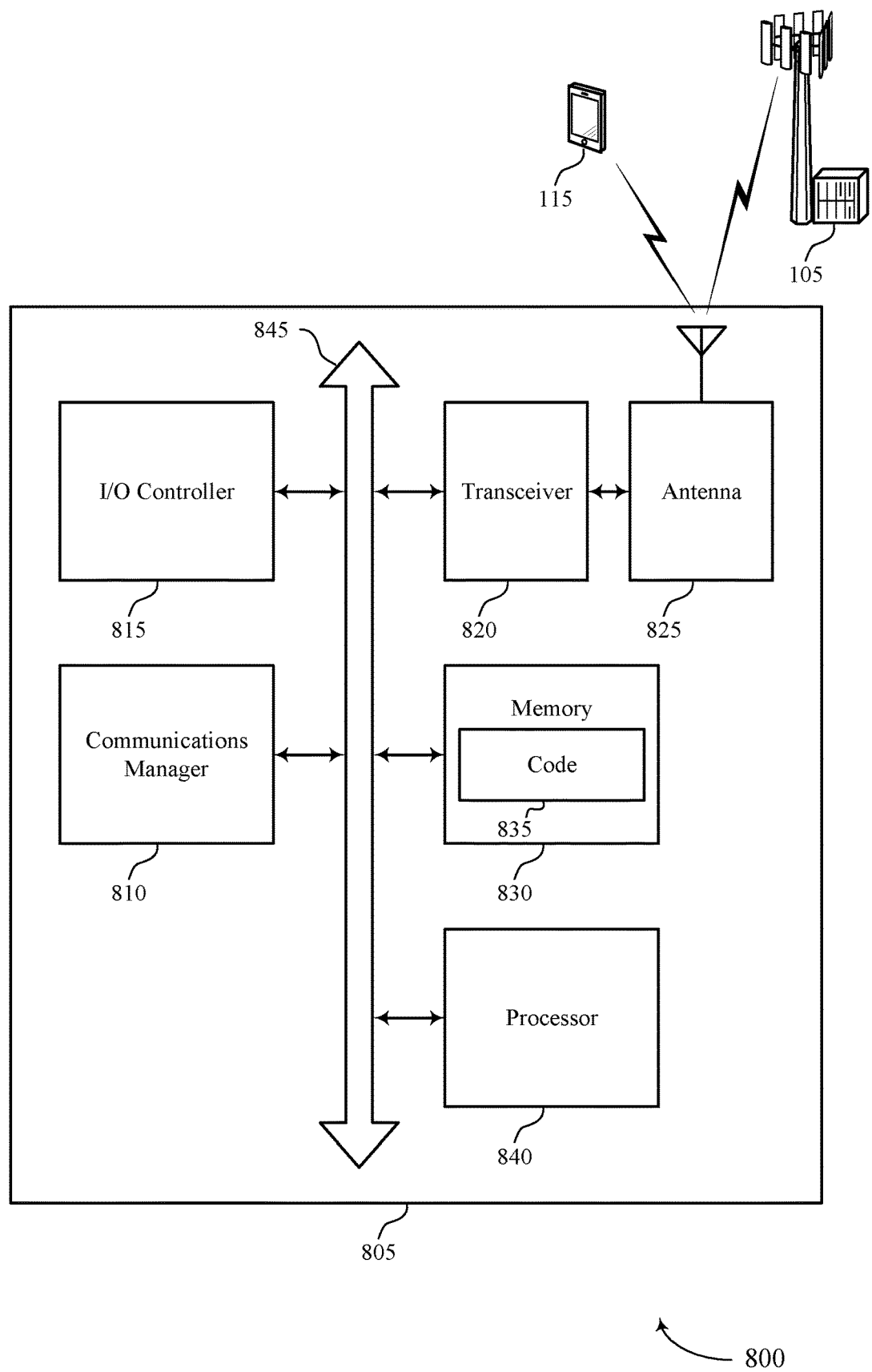
FIG. 8 shows a diagram of a system including a device that supports retransmission and fallback for AUL transmission in accordance with aspects of the present disclosure.

FIG. 8 shows a diagram of a system 800 including a device 805 that supports retransmission and fallback for AUL transmission in accordance with aspects of the present disclosure. The device 805 may be an example of or include the components of device 505, device 605, or a UE 115 as described herein. The device 805 may include components for bi-directional voice and data communications including components for transmitting and receiving communications, including a communications manager 810, an I/O controller 815, a transceiver 820, an antenna 825, memory 830, and a processor 840. These components may be in electronic communication via one or more buses (e.g., bus 845).

The communications manager 810 may transmit an AUL transmission to a base station using a configured resource set, the AUL transmission including reference signals and data signals, determine whether a response signal was received from the base station in response to the AUL transmission, upon determining that the response signal was received, determining whether the response signal indicates that the base station received the reference signals, or the reference signals and the data signals, and select an uplink transmission scheme to use for subsequent transmissions to the base station, the selected uplink transmission scheme based on the determination of whether the response signal was received from the base station and whether the response signal indicates that the base station received the reference signals or the reference signals and the data signals.

The I/O controller 815 may manage input and output signals for the device 805. The I/O controller 815 may also manage peripherals not integrated into the device 805. In some cases, the I/O controller 815 may represent a physical connection or port to an external peripheral. In some cases, the I/O controller 815 may utilize an operating system such as iOS®, ANDROID®, MS-DOS®, MS-WINDOWS®, OS/2®, UNIX®, LINUX®, or another known operating system. In other cases, the I/O controller 815 may represent or interact with a modem, a keyboard, a mouse, a touchscreen, or a similar device. In some cases, the I/O controller 815 may be implemented as part of a processor. In some cases, a user may interact with the device 805 via the I/O controller 815 or via hardware components controlled by the I/O controller 815.

The transceiver 820 may communicate bi-directionally, via one or more antennas, wired, or wireless links as described above. For example, the transceiver 820 may represent a wireless transceiver and may communicate bi-directionally with another wireless transceiver. The transceiver 820 may also include a modem to modulate the packets and provide the modulated packets to the antennas for transmission, and to demodulate packets received from the antennas.

In some cases, the wireless device may include a single antenna 825. However, in some cases the device may have more than one antenna 825, which may be capable of concurrently transmitting or receiving multiple wireless transmissions.

The memory 830 may include RAM and ROM. The memory 830 may store computer-readable, computer-executable code 835 including instructions that, when executed, cause the processor to perform various functions described herein. In some cases, the memory 830 may contain, among other things, a BIOS which may control basic hardware or software operation such as the interaction with peripheral components or devices.

The processor 840 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 840 may be configured to operate a memory array using a memory controller. In other cases, a memory controller may be integrated into the processor 840. The processor 840 may be configured to execute computer-readable instructions stored in a memory (e.g., the memory 830) to cause the device 805 to perform various functions (e.g., functions or tasks supporting retransmission and fallback for AUL transmission).

The code 835 may include instructions to implement aspects of the present disclosure, including instructions to support wireless communications. The code 835 may be stored in a non-transitory computer-readable medium such as system memory or other type of memory. In some cases, the code 835 may not be directly executable by the processor 840 but may cause a computer (e.g., when compiled and executed) to perform functions described herein.

Figure 9:
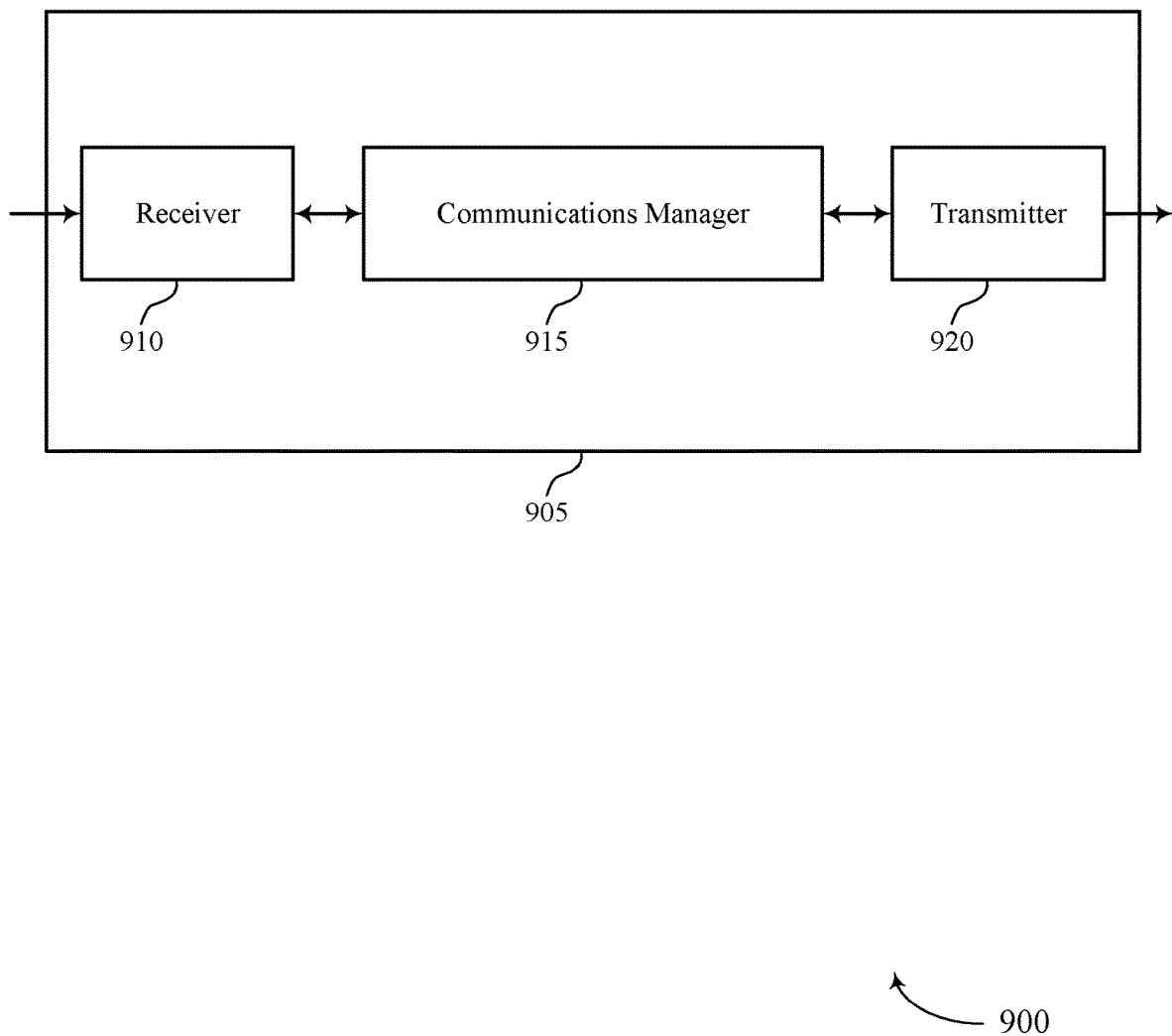
FIGS. 9 and 10 show block diagrams of devices that support retransmission and fallback for AUL transmission in accordance with aspects of the present disclosure.

FIG. 9 shows a block diagram 900 of a device 905 that supports retransmission and fallback for AUL transmission in accordance with aspects of the present disclosure. The device 905 may be an example of aspects of a base station 105 as described herein. The device 905 may include a receiver 910, a communications manager 915, and a transmitter 920. The device 905 may also include a processor. Each of these components may be in communication with one another (e.g., via one or more buses).

The receiver 910 may receive information such as packets, user data, or control information associated with various information channels (e.g., control channels, data channels, and information related to retransmission and fallback for AUL transmission, etc.). Information may be passed on to other components of the device 905. The receiver 910 may be an example of aspects of the transceiver 1220 described with reference to FIG. 12. The receiver 910 may utilize a single antenna or a set of antennas.

The communications manager 915 may detect an AUL transmission from a UE over a configured resource set, determine whether reference signals or reference signals and data signals are detected in the AUL transmission, configure, based on the determining, a response signal for transmission to the UE, and transmit the response signal to the UE. The communications manager 915 may be an example of aspects of the communications manager 1210 described herein.

The communications manager 915, or its sub-components, may be implemented in hardware, code (e.g., software or firmware) executed by a processor, or any combination thereof. If implemented in code executed by a processor, the functions of the communications manager 915, or its sub-components may be executed by a general-purpose processor, a DSP, an ASIC, a FPGA or other programmable logic device, discrete gate or transistor logic, discrete hardware components, or any combination thereof designed to perform the functions described in the present disclosure.

The communications manager 915, or its sub-components, may be physically located at various positions, including being distributed such that portions of functions are implemented at different physical locations by one or more physical components. In some examples, the communications manager 915, or its sub-components, may be a separate and distinct component in accordance with various aspects of the present disclosure. In some examples, the communications manager 915, or its sub-components, may be combined with one or more other hardware components, including but not limited to an I/O component, a transceiver, a network server, another computing device, one or more other components described in the present disclosure, or a combination thereof in accordance with various aspects of the present disclosure.

The transmitter 920 may transmit signals generated by other components of the device 905. In some examples, the transmitter 920 may be collocated with a receiver 910 in a transceiver module. For example, the transmitter 920 may be an example of aspects of the transceiver 1220 described with reference to FIG. 12. The transmitter 920 may utilize a single antenna or a set of antennas.

Figure 10:
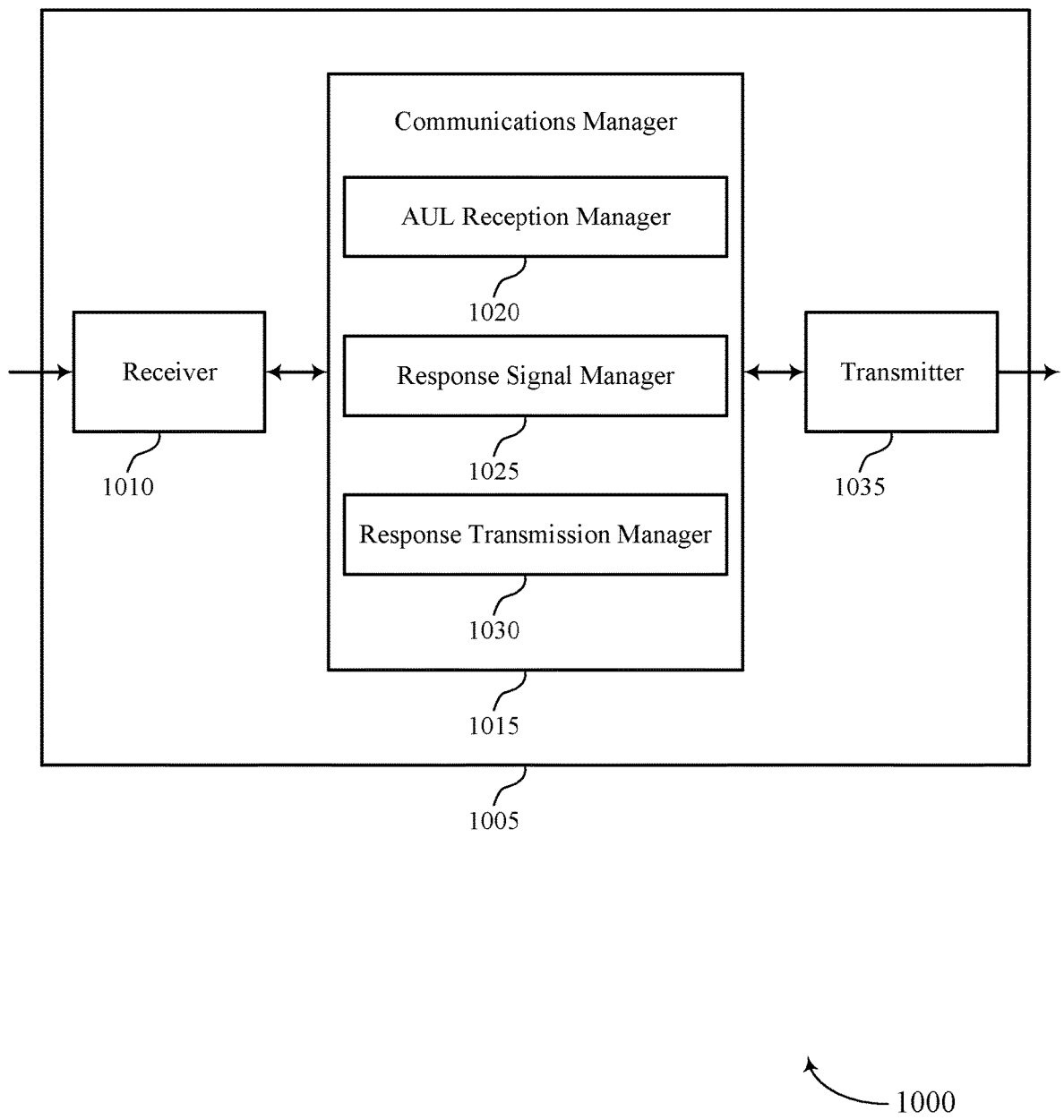

FIG. 10 shows a block diagram 1000 of a device 1005 that supports retransmission and fallback for AUL transmission in accordance with aspects of the present disclosure. The device 1005 may be an example of aspects of a device 905 or a base station 105 as described herein. The device 1005 may include a receiver 1010, a communications manager 1015, and a transmitter 1035. The device 1005 may also include a processor. Each of these components may be in communication with one another (e.g., via one or more buses).

The receiver 1010 may receive information such as packets, user data, or control information associated with various information channels (e.g., control channels, data channels, and information related to retransmission and fallback for AUL transmission, etc.). Information may be passed on to other components of the device 1005. The receiver 1010 may be an example of aspects of the transceiver 1220 described with reference to FIG. 12. The receiver 1010 may utilize a single antenna or a set of antennas.

The communications manager 1015 may be an example of aspects of the communications manager 915 as described herein. The communications manager 1015 may include an AUL reception manager 1020, a response signal manager 1025, and a response transmission manager 1030. The communications manager 1015 may be an example of aspects of the communications manager 1210 described herein.

The AUL reception manager 1020 may detect an AUL transmission from a UE over a configured resource set.

The response signal manager 1025 may determine whether reference signals or reference signals and data signals are detected in the AUL transmission and configure, based on the determining, a response signal for transmission to the UE.

The response transmission manager 1030 may transmit the response signal to the UE.

The transmitter 1035 may transmit signals generated by other components of the device 1005. In some examples, the transmitter 1035 may be collocated with a receiver 1010 in a transceiver module. For example, the transmitter 1035 may be an example of aspects of the transceiver 1220 described with reference to FIG. 12. The transmitter 1035 may utilize a single antenna or a set of antennas.

Figure 11:
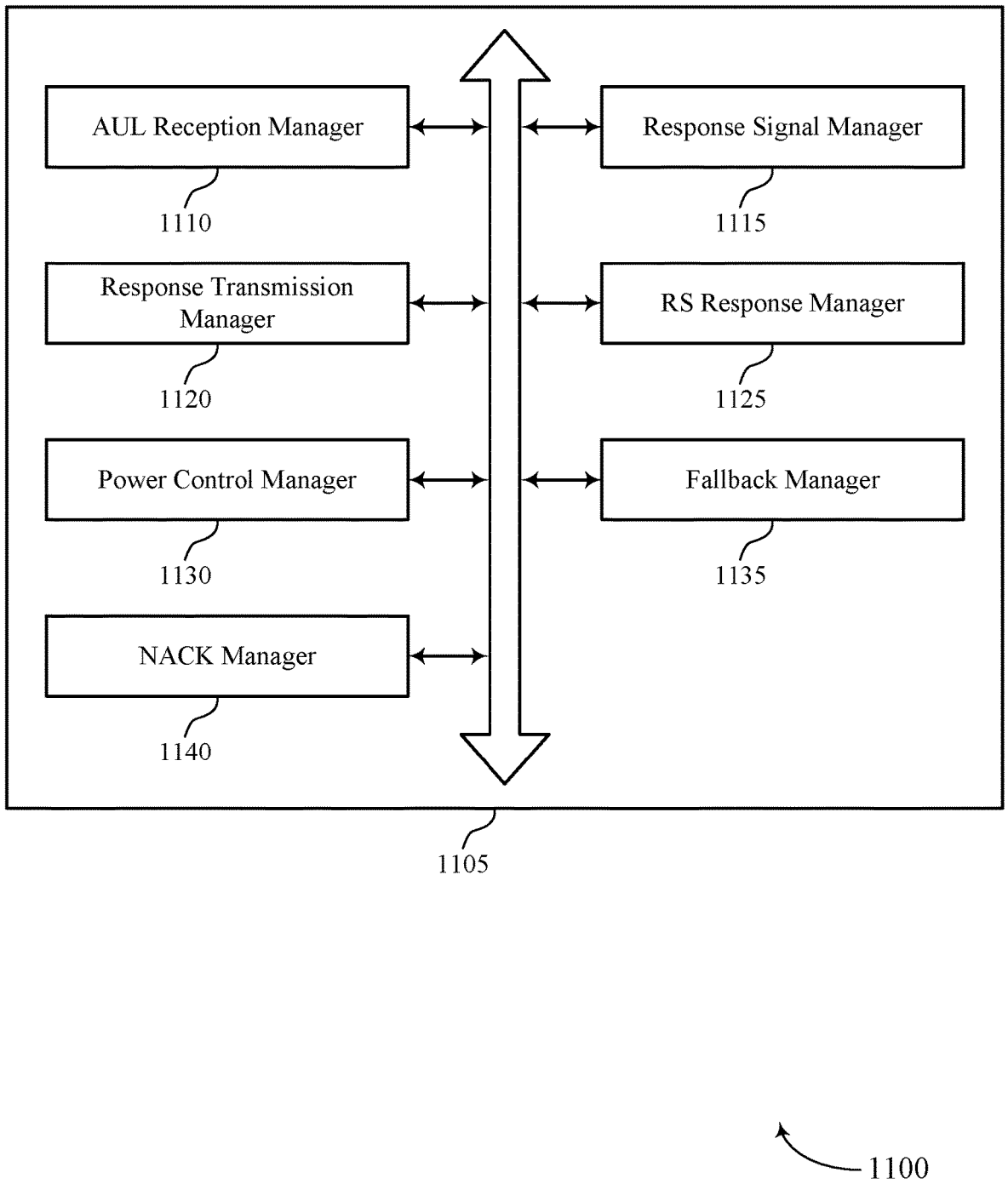
FIG. 11 shows a block diagram of a communications manager that supports retransmission and fallback for AUL transmission in accordance with aspects of the present disclosure.

FIG. 11 shows a block diagram 1100 of a communications manager 1105 that supports retransmission and fallback for AUL transmission in accordance with aspects of the present disclosure. The communications manager 1105 may be an example of aspects of a communications manager 915, a communications manager 1015, or a communications manager 1210 described herein. The communications manager 1105 may include an AUL reception manager 1110, a response signal manager 1115, a response transmission manager 1120, a RS response manager 1125, a power control manager 1130, a fallback manager 1135, and a NACK manager 1140. Each of these modules may communicate, directly or indirectly, with one another (e.g., via one or more buses).

The AUL reception manager 1110 may detect an AUL transmission from a UE over a configured resource set.

The response signal manager 1115 may determine whether reference signals or reference signals and data signals are detected in the AUL transmission. In some examples, the response signal manager 1115 may configure, based on the determining, a response signal for transmission to the UE. In some examples, the response signal manager 1115 may configure the response signal to indicate at least one of a backoff indicator, or a timing advance indicator, or a power control command, or a transport block size update indicator, or a redundancy version indicator, or a cyclic shift indicator, or an updated scrambling sequence indicator, or a retransmission request, or a resource grant for an updated configured resource set, or a combination thereof, for the UE to use for performing a retransmission of the AUL transmission.

The response transmission manager 1120 may transmit the response signal to the UE.

The RS response manager 1125 may configure the response signal to includes an indicator associated with the base station receiving the reference signals. In some examples, the RS response manager 1125 may receive a retransmission of the AUL transmission on an updated configured resource set. In some examples, the RS response manager 1125 may configure the response signal to indicate an identifier for an updated configured resource set to use for retransmitting the AUL transmission. In some examples, the RS response manager 1125 may receive the retransmission of the AUL transmission on the updated configured resource set.

The power control manager 1130 may configure the response signal to indicate a power control command.

The fallback manager 1135 may configure the response signal to indicate a fallback indicator. In some examples, the fallback manager 1135 may receive a retransmission of the AUL transmission according to a legacy transmission scheme.

The NACK manager 1140 may configure the response signal to indicate a NACK indication. In some examples, the NACK manager 1140 may receive a retransmission of the AUL transmission using the configured resources.

Figure 12:
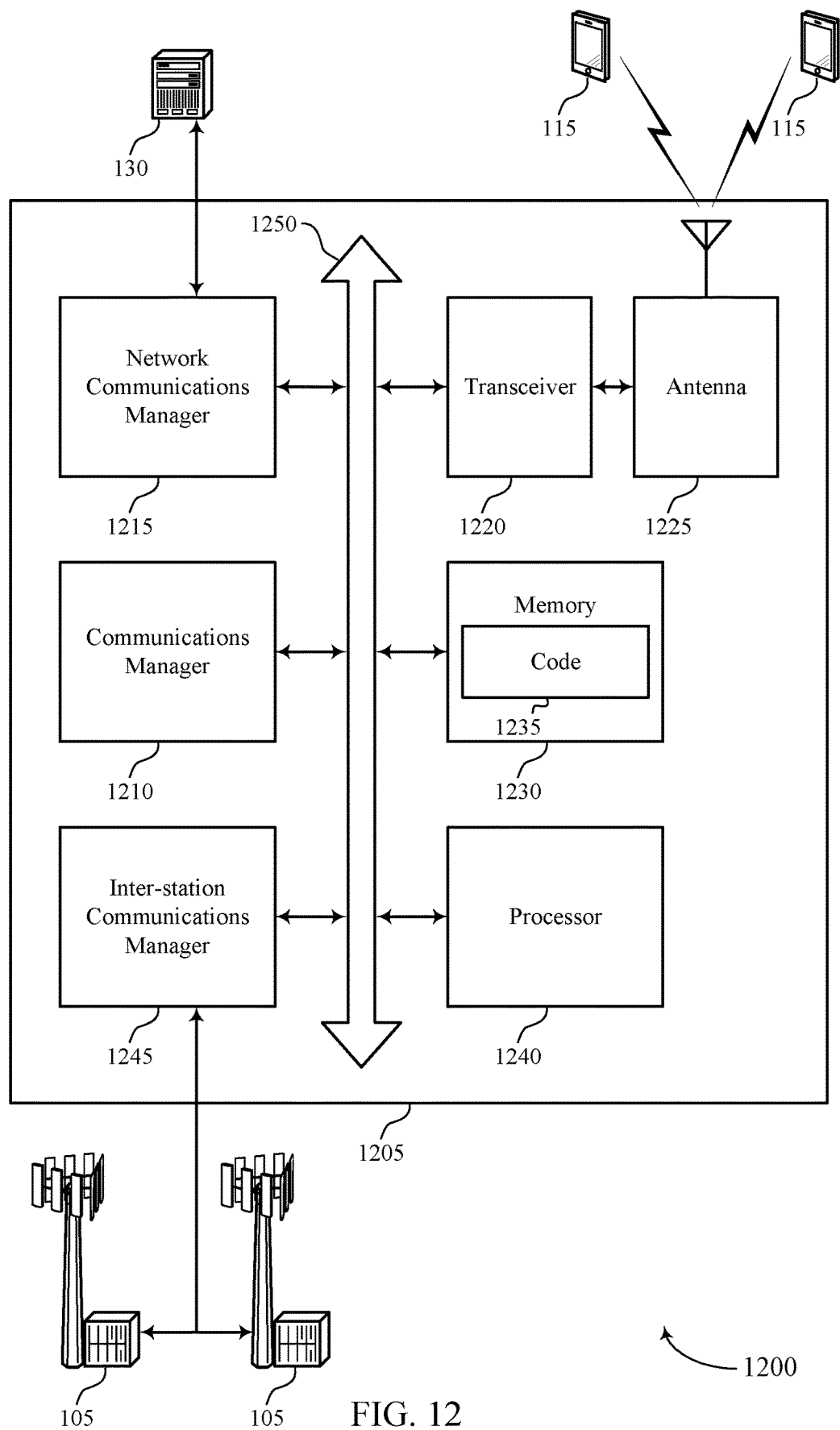
FIG. 12 shows a diagram of a system including a device that supports retransmission and fallback for AUL transmission in accordance with aspects of the present disclosure.

FIG. 12 shows a diagram of a system 1200 including a device 1205 that supports retransmission and fallback for AUL transmission in accordance with aspects of the present disclosure. The device 1205 may be an example of or include the components of device 905, device 1005, or a base station 105 as described herein. The device 1205 may include components for bi-directional voice and data communications including components for transmitting and receiving communications, including a communications manager 1210, a network communications manager 1215, a transceiver 1220, an antenna 1225, memory 1230, a processor 1240, and an inter-station communications manager 1245. These components may be in electronic communication via one or more buses (e.g., bus 1250).

The communications manager 1210 may detect an AUL transmission from a UE over a configured resource set, determine whether reference signals or reference signals and data signals are detected in the AUL transmission, configure, based on the determining, a response signal for transmission to the UE, and transmit the response signal to the UE.

The network communications manager 1215 may manage communications with the core network (e.g., via one or more wired backhaul links). For example, the network communications manager 1215 may manage the transfer of data communications for client devices, such as one or more UEs 115.

The transceiver 1220 may communicate bi-directionally, via one or more antennas, wired, or wireless links as described above. For example, the transceiver 1220 may represent a wireless transceiver and may communicate bi-directionally with another wireless transceiver. The transceiver 1220 may also include a modem to modulate the packets and provide the modulated packets to the antennas for transmission, and to demodulate packets received from the antennas.

In some cases, the wireless device may include a single antenna 1225. However, in some cases the device may have more than one antenna 1225, which may be capable of concurrently transmitting or receiving multiple wireless transmissions.

The memory 1230 may include RAM, ROM, or a combination thereof. The memory 1230 may store computer-readable code 1235 including instructions that, when executed by a processor (e.g., the processor 1240) cause the device to perform various functions described herein. In some cases, the memory 1230 may contain, among other things, a BIOS which may control basic hardware or software operation such as the interaction with peripheral components or devices.

The processor 1240 may include an intelligent hardware device, (e.g., a general-purpose processor, a DSP, a CPU, a microcontroller, an ASIC, an FPGA, a programmable logic device, a discrete gate or transistor logic component, a discrete hardware component, or any combination thereof). In some cases, the processor 1240 may be configured to operate a memory array using a memory controller. In some cases, a memory controller may be integrated into processor 1240. The processor 1240 may be configured to execute computer-readable instructions stored in a memory (e.g., the memory 1230) to cause the device #{device} to perform various functions (e.g., functions or tasks supporting retransmission and fallback for AUL transmission).

The inter-station communications manager 1245 may manage communications with other base station 105, and may include a controller or scheduler for controlling communications with UEs 115 in cooperation with other base stations 105. For example, the inter-station communications manager 1245 may coordinate scheduling for transmissions to UEs 115 for various interference mitigation techniques such as beamforming or joint transmission. In some examples, the inter-station communications manager 1245 may provide an X2 interface within an LTE/LTE-A wireless communication network technology to provide communication between base stations 105.

The code 1235 may include instructions to implement aspects of the present disclosure, including instructions to support wireless communications. The code 1235 may be stored in a non-transitory computer-readable medium such as system memory or other type of memory. In some cases, the code 1235 may not be directly executable by the processor 1240 but may cause a computer (e.g., when compiled and executed) to perform functions described herein.

Figure 13:
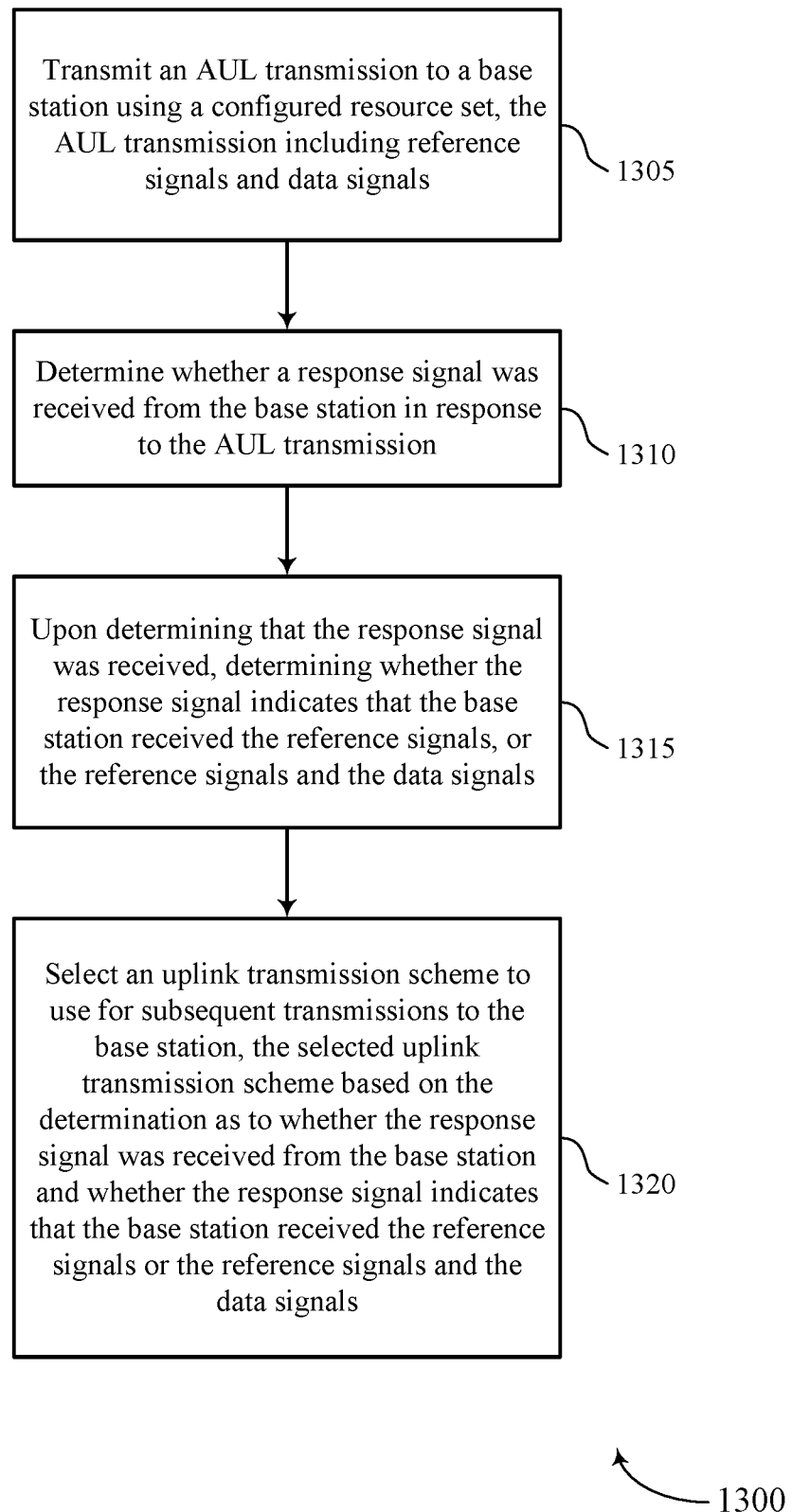
FIGS. 13 through 15 show flowcharts illustrating methods that support retransmission and fallback for AUL transmission in accordance with aspects of the present disclosure.

FIG. 13 shows a flowchart illustrating a method 1300 that supports retransmission and fallback for AUL transmission in accordance with aspects of the present disclosure. The operations of method 1300 may be implemented by a UE 115 or its components as described herein. For example, the operations of method 1300 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1305, the UE may transmit an AUL transmission to a base station using a configured resource set, the AUL transmission including reference signals and data signals. The operations of 1305 may be performed according to the methods described herein. In some examples, aspects of the operations of 1305 may be performed by an AUL transmission manager as described with reference to FIGS. 5 through 8.

At 1310, the UE may determine whether a response signal was received from the base station in response to the AUL transmission. The operations of 1310 may be performed according to the methods described herein. In some examples, aspects of the operations of 1310 may be performed by a response signal manager as described with reference to FIGS. 5 through 8.

At 1315, the UE may upon determining that the response signal was received, determining whether the response signal indicates that the base station received the reference signals, or the reference signals and the data signals. The operations of 1315 may be performed according to the methods described herein. In some examples, aspects of the operations of 1315 may be performed by a response signal manager as described with reference to FIGS. 5 through 8.

At 1320, the UE may select an uplink transmission scheme to use for subsequent transmissions to the base station, the selected uplink transmission scheme based on the determination of whether the response signal was received from the base station and whether the response signal indicates that the base station received the reference signals or the reference signals and the data signals. The operations of 1320 may be performed according to the methods described herein. In some examples, aspects of the operations of 1320 may be performed by a retransmission/fallback manager as described with reference to FIGS. 5 through 8.

Figure 14:
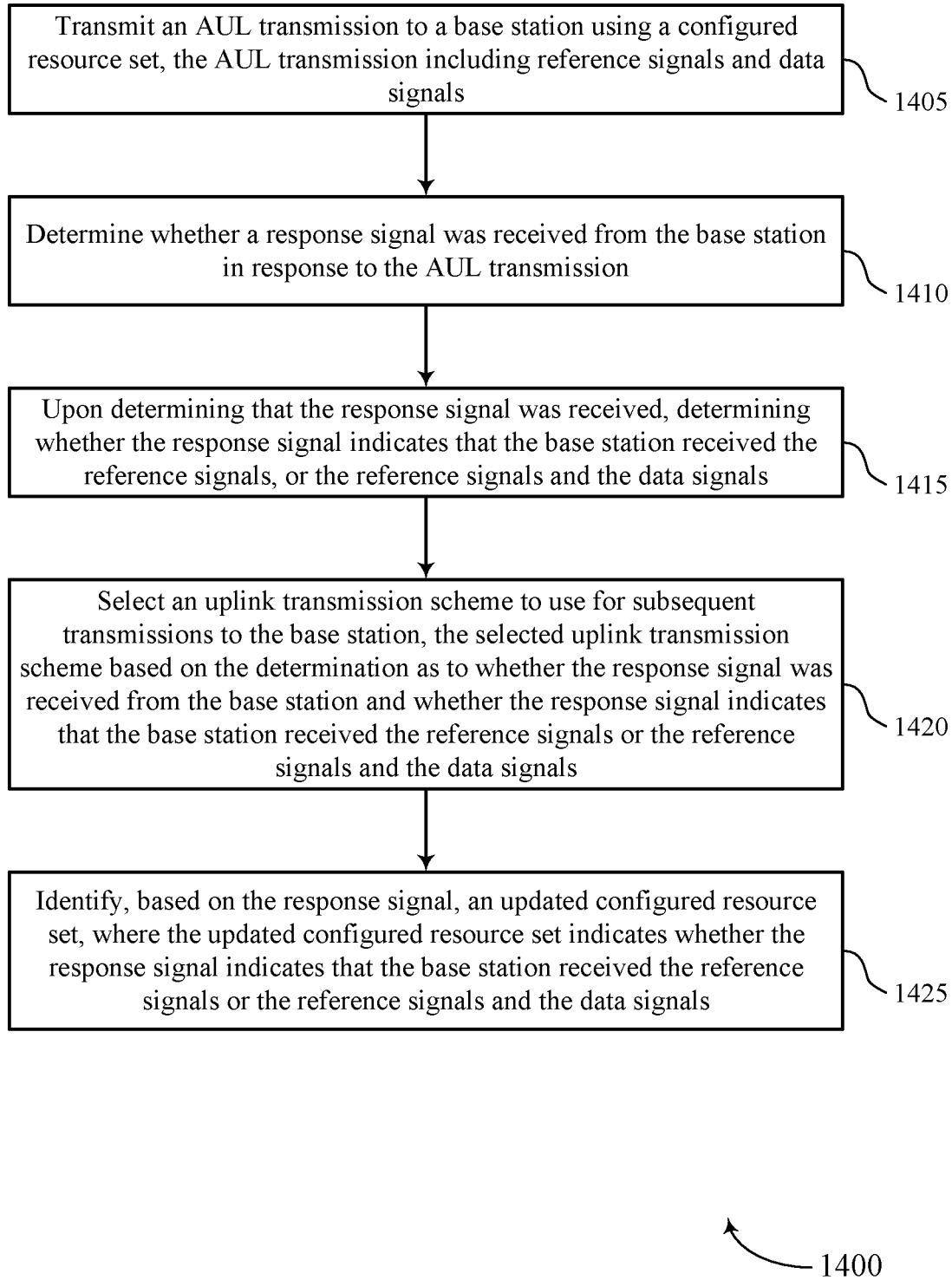

FIG. 14 shows a flowchart illustrating a method 1400 that supports retransmission and fallback for AUL transmission in accordance with aspects of the present disclosure. The operations of method 1400 may be implemented by a UE 115 or its components as described herein. For example, the operations of method 1400 may be performed by a communications manager as described with reference to FIGS. 5 through 8. In some examples, a UE may execute a set of instructions to control the functional elements of the UE to perform the functions described below. Additionally or alternatively, a UE may perform aspects of the functions described below using special-purpose hardware.

At 1405, the UE may transmit an AUL transmission to a base station using a configured resource set, the AUL transmission including reference signals and data signals. The operations of 1405 may be performed according to the methods described herein. In some examples, aspects of the operations of 1405 may be performed by an AUL transmission manager as described with reference to FIGS. 5 through 8.

At 1410, the UE may determine whether a response signal was received from the base station in response to the AUL transmission. The operations of 1410 may be performed according to the methods described herein. In some examples, aspects of the operations of 1410 may be performed by a response signal manager as described with reference to FIGS. 5 through 8.

At 1415, the UE may upon determining that the response signal was received, determining whether the response signal indicates that the base station received the reference signals, or the reference signals and the data signals. The operations of 1415 may be performed according to the methods described herein. In some examples, aspects of the operations of 1415 may be performed by a response signal manager as described with reference to FIGS. 5 through 8.

At 1420, the UE may select an uplink transmission scheme to use for subsequent transmissions to the base station, the selected uplink transmission scheme based on the determination of whether the response signal was received from the base station and whether the response signal indicates that the base station received the reference signals or the reference signals and the data signals. The operations of 1420 may be performed according to the methods described herein. In some examples, aspects of the operations of 1420 may be performed by a retransmission/fallback manager as described with reference to FIGS. 5 through 8.

At 1425, the UE may identify, based on the response signal, an updated configured resource set, where the updated configured resource set indicates whether the response signal indicates that the base station received the reference signals or the reference signals and the data signals. The operations of 1425 may be performed according to the methods described herein. In some examples, aspects of the operations of 1425 may be performed by an implicit response manager as described with reference to FIGS. 5 through 8.

Figure 15:
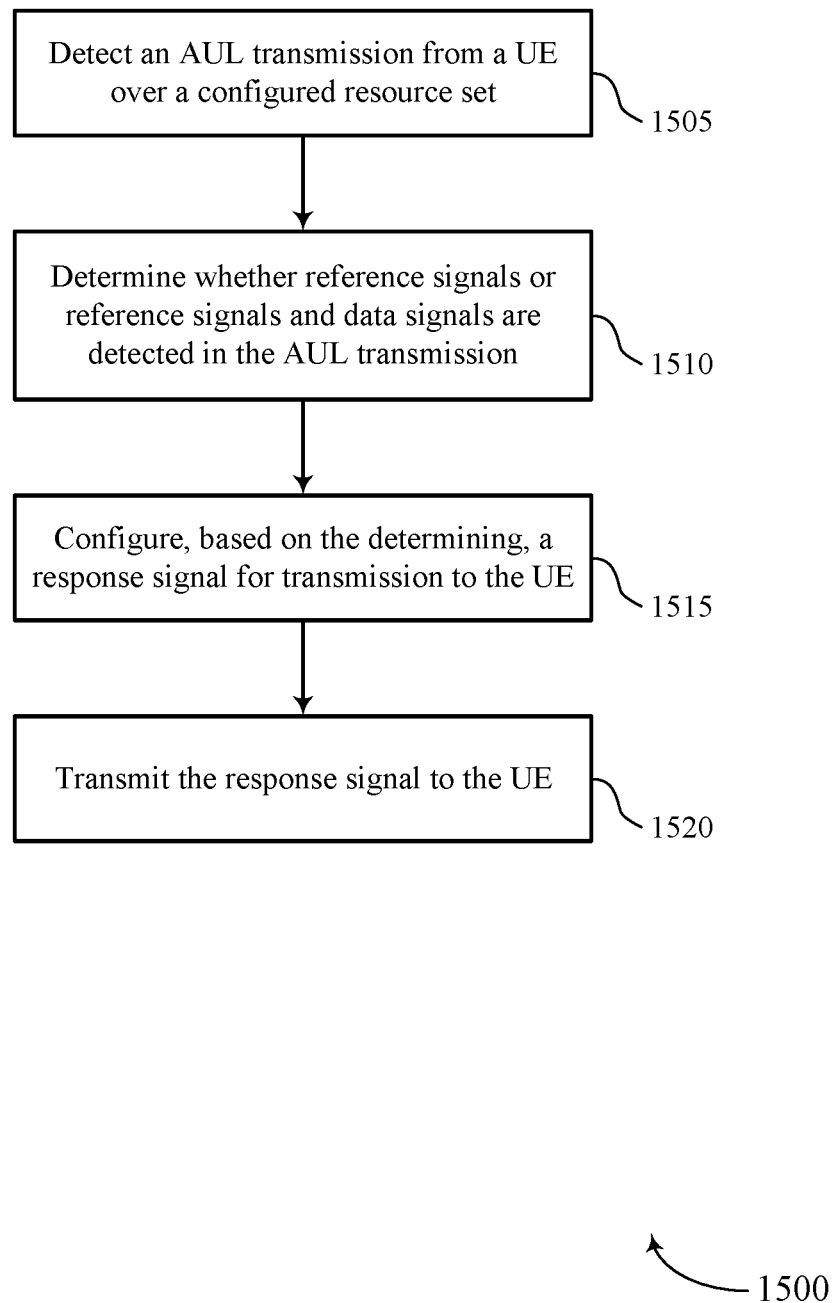

FIG. 15 shows a flowchart illustrating a method 1500 that supports retransmission and fallback for AUL transmission in accordance with aspects of the present disclosure. The operations of method 1500 may be implemented by a base station 105 or its components as described herein. For example, the operations of method 1500 may be performed by a communications manager as described with reference to FIGS. 9 through 12. In some examples, a base station may execute a set of instructions to control the functional elements of the base station to perform the functions described below. Additionally or alternatively, a base station may perform aspects of the functions described below using special-purpose hardware.

At 1505, the base station may detect an AUL transmission from a UE over a configured resource set. The operations of 1505 may be performed according to the methods described herein. In some examples, aspects of the operations of 1505 may be performed by an AUL reception manager as described with reference to FIGS. 9 through 12.

At 1510, the base station may determine whether reference signals or reference signals and data signals are detected in the AUL transmission. The operations of 1510 may be performed according to the methods described herein. In some examples, aspects of the operations of 1510 may be performed by a response signal manager as described with reference to FIGS. 9 through 12.

At 1515, the base station may configure, based on the determining, a response signal for transmission to the UE. The operations of 1515 may be performed according to the methods described herein. In some examples, aspects of the operations of 1515 may be performed by a response signal manager as described with reference to FIGS. 9 through 12.

At 1520, the base station may transmit the response signal to the UE. The operations of 1520 may be performed according to the methods described herein. In some examples, aspects of the operations of 1520 may be performed by a response transmission manager as described with reference to FIGS. 9 through 12.

It should be noted that the methods described above describe possible implementations, and that the operations and the steps may be rearranged or otherwise modified and that other implementations are possible. Further, aspects from two or more of the methods may be combined.

Techniques described herein may be used for various wireless communications systems such as code division multiple access (CDMA), time division multiple access (TDMA), frequency division multiple access (FDMA), orthogonal frequency division multiple access (OFDMA), single carrier frequency division multiple access (SC-FDMA), and other systems. A CDMA system may implement a radio technology such as CDMA2000, Universal Terrestrial Radio Access (UTRA), etc. CDMA2000 covers IS-2000, IS-95, and IS-856 standards. IS-2000 Releases may be commonly referred to as CDMA2000 1x, 1x, etc. IS-856 (TIA-856) is commonly referred to as CDMA2000 1xEV-DO, High Rate Packet Data (HRPD), etc. UTRA includes Wideband CDMA (WCDMA) and other variants of CDMA. A TDMA system may implement a radio technology such as Global System for Mobile Communications (GSM).

An OFDMA system may implement a radio technology such as Ultra Mobile Broadband (UMB), Evolved UTRA (E-UTRA), Institute of Electrical and Electronics Engineers (IEEE) 802.11 (Wi-Fi), IEEE 802.16 (WiMAX), IEEE 802.20, Flash-OFDM, etc. UTRA and E-UTRA are part of Universal Mobile Telecommunications System (UMTS). LTE, LTE-A, and LTE-A Pro are releases of UMTS that use E-UTRA. UTRA, E-UTRA, UMTS, LTE, LTE-A, LTE-A Pro, NR, and GSM are described in documents from the organization named "3rd Generation Partnership Project" (3GPP). CDMA2000 and UMB are described in documents from an organization named "3rd Generation Partnership Project 2" (3GPP2). The techniques described herein may be used for the systems and radio technologies mentioned above as well as other systems and radio technologies. While aspects of an LTE, LTE-A, LTE-A Pro, or NR system may be described for purposes of example, and LTE, LTE-A, LTE-A Pro, or NR terminology may be used in much of the description, the techniques described herein are applicable beyond LTE, LTE-A, LTE-A Pro, or NR applications.

A macro cell generally covers a relatively large geographic area (e.g., several kilometers in radius) and may allow unrestricted access by UEs 115 with service subscriptions with the network provider. A small cell may be associated with a lower-powered base station 105, as compared with a macro cell, and a small cell may operate in the same or different (e.g., licensed, unlicensed, etc.) frequency bands as macro cells. Small cells may include pico cells, femto cells, and micro cells according to various examples. A pico cell, for example, may cover a small geographic area and may allow unrestricted access by UEs 115 with service subscriptions with the network provider. A femto cell may also cover a small geographic area (e.g., a home) and may provide restricted access by UEs 115 having an association with the femto cell (e.g., UEs 115 in a closed subscriber group (CSG), UEs 115 for users in the home, and the like). An eNB for a macro cell may be referred to as a macro eNB. An eNB for a small cell may be referred to as a small cell eNB, a pico eNB, a femto eNB, or a home eNB. An eNB may support one or multiple (e.g., two, three, four, and the like) cells, and may also support communications using one or multiple component carriers.

The wireless communications system 100 or systems described herein may support synchronous or asynchronous operation. For synchronous operation, the base stations 105 may have similar frame timing, and transmissions from different base stations 105 may be approximately aligned in time. For asynchronous operation, the base stations 105 may have different frame timing, and transmissions from different base stations 105 may not be aligned in time. The techniques described herein may be used for either synchronous or asynchronous operations.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a digital signal processor (DSP), an application-specific integrated circuit (ASIC), a field-programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations.

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media may include random-access memory (RAM), read-only memory (ROM), electrically erasable programmable read only memory (EEPROM), flash memory, compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

As used herein, including in the claims, "or" as used in a list of items (e.g., a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label, or other subsequent reference label.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details for the purpose of providing an understanding of the described techniques. These techniques, however, may be practiced without these specific details. In some instances, well-known structures and devices are shown in block diagram form in order to avoid obscuring the concepts of the described examples.

The description herein is provided to enable a person skilled in the art to make or use the disclosure. Various modifications to the disclosure will be readily apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method for wireless communication at a user equipment (UE), comprising:
transmitting an autonomous uplink transmission to a network device using a configured resource set, the autonomous uplink transmission comprising a message one (Msg1) of a random access procedure, the Msg1 comprising demodulation reference signals and data signals;
receiving a response signal from the network device in response to the autonomous uplink transmission, wherein
the response signal indicates that the network device received the demodulation reference signals but not the data signals, the response signal comprising a message two (Msg2) of the random access procedure; and
selecting an uplink transmission scheme to use for subsequent transmissions to the network device, the selected uplink transmission scheme based at least in part on the receiving the response signal was received from the network device and that the response signal indicates that the network device received the demodulation reference signals but not the data signals.

2. The method of claim 1, further comprising:
selecting, based at least in part on the indication, an updated configured resource set to use for retransmitting the autonomous uplink transmission; and
retransmitting the autonomous uplink transmission using the updated configured resource set.

3. The method of claim 1, wherein the response signal indicates
a second identifier for an updated configured resource set to use for retransmitting the autonomous uplink transmission, the method further comprising:
selecting, based at least in part on the second identifier, the updated configured resource set to use for retransmitting the autonomous uplink transmission.

4. The method of claim 3, wherein the updated configured resource set comprises at least one of a larger bandwidth parameter, a larger transmission window parameter, a larger resource set, or a combination thereof, than the configured resource set.

5. The method of claim 3, wherein the response signal comprises a power control command, further comprising:
selecting, based at least in part on the power control command, a transmit power to use for the retransmission of the autonomous uplink transmission.

6. The method of claim 1,
wherein the response signal conveys a negative-acknowledgement (NACK) indicator, the method further comprising:
performing a retransmission of the autonomous uplink transmission using the configured resources.

7. The method of claim 1,
wherein the response signal comprises at least one of a backoff indicator, or a timing advance indicator, or a power control command, or a transport block size update indicator, or a redundancy version indicator, or a cyclic shift indicator, or an updated scrambling sequence indicator, or a retransmission request, or a resource grant for an updated configured resource set, or a combination thereof, to use for performing a retransmission of the autonomous uplink transmission.

8. The method of claim 1, wherein the response signal comprises a fallback indicator, further comprising:
selecting, based at least in part on the fallback indicator, a legacy transmission scheme to use for retransmitting the autonomous uplink transmission.

9. The method of claim 1, wherein the response signal comprises a fallback indicator, further comprising:

skipping, based at least in part on the fallback indicator, a first portion of a legacy transmission scheme when retransmitting the autonomous uplink transmission.

10. The method of claim 1, wherein the response signal comprises an acknowledgement (ACK) indicator, further comprising:
selecting, based at least in part on the ACK indicator, a transmission scheme that uses the configured resource set for subsequent transmissions to the network device.

11. The method of claim 1,
wherein reception of the response signal from the network device is indicated based at least in part on an identifier associated with the configured resource set, on the identifier associated with the demodulation reference signals, or a combination thereof.

12. The method of claim 1,
wherein the response signal indicates, based at least in part on one or more bits or fields in the response signal, that the network device received the demodulation reference signals but not the data signals.

13. The method of claim 1, further comprising:
wherein an updated configured resource set associated with the response signal indicates that the response signal indicates that the network device received the demodulation reference signals but not the data signals.

14. A method for wireless communication at a network device, comprising:
detecting an autonomous uplink transmission from a user equipment (UE) over a configured resource set, the autonomous uplink transmission comprising a message one (Msg1) of a random access procedure, the Msg1 comprising demodulation reference signals and data signal, wherein the demodulation reference signals but not the data signals are detected in the autonomous uplink transmission;
configuring, based at least in part on the determining, a response signal for transmission to the UE to indicate the demodulation reference signals were received but not the data signals; and
transmitting the response signal to the UE, the response signal comprising a message two (Msg2) of the random access procedure.

15. The method of claim 14, further comprising:
configuring the response signal to comprises an indicator associated with the network device receiving the demodulation reference signals.

16. The method of claim 15, further comprising:
receiving a retransmission of the autonomous uplink transmission on an updated configured resource set.

17. The method of claim 15, further comprising:
configuring the response signal to indicate an identifier for an updated configured resource set to use for retransmitting the autonomous uplink transmission; and
receiving the retransmission of the autonomous uplink transmission on the updated configured resource set.

18. The method of claim 14, further comprising:
configuring the response signal to indicate a power control command.

19. The method of claim 14, further comprising:
configuring the response signal to indicate a fallback indicator; and
receiving a retransmission of the autonomous uplink transmission according to a legacy transmission scheme.

20. The method of claim 14, further comprising:
configuring the response signal to indicate a negative-acknowledgement (NACK) indication; and
receiving a retransmission of the autonomous uplink transmission using the configured resources.

21. The method of claim 14, further comprising:
configuring the response signal to indicate at least one of a backoff indicator, or a timing advance indicator, or a power control command, or a transport block size update indicator, or a redundancy version indicator, or a cyclic shift indicator, or an updated scrambling sequence indicator, or a retransmission request, or a resource grant for an updated configured resource set, or a combination thereof, for the UE to use for performing a retransmission of the autonomous uplink transmission.

22. An apparatus for wireless communication at a user equipment (UE), comprising:
a processor,
memory coupled with the processor; and
instructions stored in the memory and executable by the processor to cause the UE to:
transmit an autonomous uplink transmission to a network device using a configured resource set, the autonomous uplink transmission comprising a message one (Msg1) of a random access procedure, the Msg1 comprising demodulation reference signals and data signals;
receive a response signal from the network device in response to the autonomous uplink transmission, wherein
the response signal indicates that the network device received the demodulation reference signals but not the data signals, the response signal comprising a message two (Msg2) of the random access procedure; and
select an uplink transmission scheme to use for subsequent transmissions to the network device, the selected uplink transmission scheme based at least in part on receiving the response signal from the network device and that the response signal indicates that the network device received the demodulation reference signals but not the data signals.

23. An apparatus for wireless communication at a network device, comprising:
a processor,
memory coupled with the processor; and
instructions stored in the memory and executable by the processor to cause the network device to:
detect an autonomous uplink transmission from a user equipment (UE) over a configured resource set, the autonomous uplink transmission comprising a message one (Msg1) of a random access procedure, the Msg1 comprising demodulation reference signals and data signals, wherein the demodulation reference signals but not the data signals are detected in the autonomous uplink transmission;
configure, based at least in part on the determining, a response signal for transmission to the UE to indicate the demodulation reference signals were received but not the data signals; and
transmit the response signal to the UE, the response signal comprising a message two (Msg2) of the random access procedure.

24. An apparatus for wireless communication at a user equipment (UE), comprising:
means for transmitting an autonomous uplink transmission to a network device using a configured resource set, the autonomous uplink transmission comprising a message one (Msg1) of a random access procedure, the Msg1 comprising demodulation reference signals and data signals;

means for receiving a response signal from the network device in response to the autonomous uplink transmission, wherein the response signal indicates that the network device received the demodulation reference signals but not the data signals, the response signal comprising a message two (Msg2) of the random access procedure; and means for selecting an uplink transmission scheme to use for subsequent transmissions to the network device, the selected uplink transmission scheme based at least in part on receiving the response signal from the network device and that the response signal indicates that the network device received the demodulation reference signals but not the data signals.

25. An apparatus for wireless communication at a network device, comprising:

means for detecting an autonomous uplink transmission from a user equipment (UE) over a configured resource set, the autonomous uplink transmission comprising a message one (Msg1) of a random access procedure, the Msg1 comprising demodulation reference signals and data signals, wherein the demodulation reference signals but not the data signals are detected in the autonomous uplink transmission;

means for configuring, based at least in part on the determining, a response signal for transmission to the UE to indicate the demodulation reference signals where received but not the data signals; and means for transmitting the response signal to the UE, the response signal comprising a message two (Msg2) of the random access procedure.

26. A non-transitory computer-readable medium storing code for wireless communication at a user equipment (UE), the code comprising instructions executable by a processor to:

transmit an autonomous uplink transmission to a network device using a configured resource set, the autonomous uplink transmission comprising a message one (Msg1) of a random access procedure, the Msg1 comprising demodulation reference signals and data signals;

receive a response signal from the network device in response to the autonomous uplink transmission, wherein the response signal indicates that the network device received the demodulation reference signals but not the data signals, the response signal comprising a message two (Msg2) of the random access procedure; and select an uplink transmission scheme to use for subsequent transmissions to the network device, the selected uplink transmission scheme based at least in part on receiving the response signal from the network device and that the response signal indicates that the network device received the demodulation reference signals but not the data signals.

27. A non-transitory computer-readable medium storing code for wireless communication at a network device, the code comprising instructions executable by a processor to:

detect an autonomous uplink transmission from a user equipment (UE) over a configured resource set, the autonomous uplink transmission comprising a message one (Msg1) of a random access procedure, the Msg1 comprising demodulation reference signals and data signals, wherein the demodulation reference signals but not the data signals are detected in the autonomous uplink transmission;

configure, based at least in part on the determining, a response signal for transmission to the UE to indicate the demodulation reference signals were received but not the data signals; and transmit the response signal to the UE, the response signal comprising a message two (Msg2) of the random access procedure.

* * * * *